US008731929B2

(12) United States Patent
Kennewick et al.

(10) Patent No.: US 8,731,929 B2
(45) Date of Patent: May 20, 2014

(54) AGENT ARCHITECTURE FOR DETERMINING MEANINGS OF NATURAL LANGUAGE UTTERANCES

(75) Inventors: Robert A. Kennewick, Seattle, WA (US); David Locke, Redmond, WA (US); Michael R. Kennewick, Sr., Bellevue, WA (US); Michael R. Kennewick, Jr., Bellevue, WA (US); Richard Kennewick, Woodinville, WA (US); Tom Freeman, Mercer Island, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 394 days.

(21) Appl. No.: 12/365,516

(22) Filed: Feb. 4, 2009

(65) Prior Publication Data

US 2009/0171664 A1    Jul. 2, 2009

Related U.S. Application Data

(60) Continuation of application No. 11/747,547, filed on May 11, 2007, now Pat. No. 7,502,738, which is a division of application No. 10/452,147, filed on Jun. 3, 2003, now Pat. No. 7,398,209.

(60) Provisional application No. 60/384,388, filed on Jun. 3, 2002.

(51) Int. Cl.
*G10L 15/18* (2013.01)
*G10L 17/00* (2013.01)
*G06F 17/27* (2006.01)
*G06F 17/30* (2006.01)

(52) U.S. Cl.
USPC ........ 704/257; 704/246; 704/270.1; 707/709; 707/771

(58) Field of Classification Search
USPC ............. 704/257, 270, 270.1, 275, 246; 707/709, 721, 751, 771
See application file for complete search history.

(56) References Cited

U.S. PATENT DOCUMENTS

| 4,430,669 A | 2/1984 | Cheung ............... 358/122 |
| 4,821,027 A | 4/1989 | Mallory et al. ........ 340/521 |

(Continued)

FOREIGN PATENT DOCUMENTS

| EP | 1 320 043 A2 | 6/2003 |
| EP | 1 646 037 | 4/2006 |

(Continued)

OTHER PUBLICATIONS

Statement in Accordance with the Notice from the European Patent Office dated Oct. 1, 2007 Concerning Business Methods (OJ EPO Nov. 2007, 592-593), XP002456252.

(Continued)

*Primary Examiner* — Martin Lerner
(74) *Attorney, Agent, or Firm* — Pillsbury Winthrop Shaw Pittman LLP

(57) ABSTRACT

Systems and methods for receiving natural language queries and/or commands and execute the queries and/or commands. The systems and methods overcomes the deficiencies of prior art speech query and response systems through the application of a complete speech-based information query, retrieval, presentation and command environment. This environment makes significant use of context, prior information, domain knowledge, and user specific profile data to achieve a natural environment for one or more users making queries or commands in multiple domains. Through this integrated approach, a complete speech-based natural language query and response environment can be created. The systems and methods creates, stores and uses extensive personal profile information for each user, thereby improving the reliability of determining the context and presenting the expected results for a particular question or command.

50 Claims, 7 Drawing Sheets

(56) References Cited

U.S. PATENT DOCUMENTS

| | | | |
|---|---|---|---|
| 4,829,423 A | 5/1989 | Tennant et al. | 364/200 |
| 4,910,784 A * | 3/1990 | Doddington et al. | 704/251 |
| 5,027,406 A * | 6/1991 | Roberts et al. | 704/244 |
| 5,155,743 A | 10/1992 | Jacobs | 375/28 |
| 5,164,904 A | 11/1992 | Sumner | 364/436 |
| 5,208,748 A | 5/1993 | Flores et al. | 364/419 |
| 5,274,560 A | 12/1993 | LaRue | 364/444 |
| 5,357,596 A | 10/1994 | Takebayashi et al. | 395/2.84 |
| 5,377,350 A | 12/1994 | Skinner | 395/600 |
| 5,386,556 A | 1/1995 | Hedin et al. | 395/600 |
| 5,424,947 A | 6/1995 | Nagao et al. | 364/419.08 |
| 5,471,318 A | 11/1995 | Ahuja et al. | 358/400 |
| 5,475,733 A | 12/1995 | Eisdorfer et al. | 379/52 |
| 5,488,652 A | 1/1996 | Bielby et al. | 379/88 |
| 5,499,289 A | 3/1996 | Bruno et al. | 379/220 |
| 5,500,920 A | 3/1996 | Kupiec | 395/2.79 |
| 5,517,560 A | 5/1996 | Greenspan | 379/114 |
| 5,533,108 A | 7/1996 | Harris et al. | 379/201 |
| 5,537,436 A | 7/1996 | Bottoms et al. | 375/222 |
| 5,539,744 A | 7/1996 | Chu et al. | 370/60 |
| 5,557,667 A | 9/1996 | Bruno et al. | 379/201 |
| 5,559,864 A | 9/1996 | Kennedy, Jr. | 379/59 |
| 5,563,937 A | 10/1996 | Bruno et al. | 379/201 |
| 5,577,165 A | 11/1996 | Takebayashi et al. | 395/2.84 |
| 5,590,039 A | 12/1996 | Ikeda et al. | 395/759 |
| 5,608,635 A | 3/1997 | Tamai | 364/449.3 |
| 5,617,407 A | 4/1997 | Bareis | 369/275.3 |
| 5,633,922 A | 5/1997 | August et al. | 379/220 |
| 5,652,570 A | 7/1997 | Lepkofker | 340/573 |
| 5,675,629 A | 10/1997 | Raffel et al. | 379/58 |
| 5,696,965 A | 12/1997 | Dedrick | 395/610 |
| 5,708,422 A | 1/1998 | Blonder et al. | 340/825.34 |
| 5,721,938 A | 2/1998 | Stuckey | 395/754 |
| 5,722,084 A | 2/1998 | Chakrin et al. | 455/551 |
| 5,740,256 A | 4/1998 | Castello Da Costa et al. | 361/94.7 |
| 5,742,763 A | 4/1998 | Jones | 395/200.3 |
| 5,748,841 A | 5/1998 | Morin et al. | 395/2.66 |
| 5,748,974 A | 5/1998 | Johnson | 395/759 |
| 5,752,052 A | 5/1998 | Richardson et al. | 395/759 |
| 5,754,784 A | 5/1998 | Garland et al. | 395/200.49 |
| 5,761,631 A | 6/1998 | Nasukawa | 704/9 |
| 5,774,841 A | 6/1998 | Salazar et al. | 704/225 |
| 5,774,859 A | 6/1998 | Houser et al. | 704/275 |
| 5,794,050 A | 8/1998 | Dahlgren et al. | 395/708 |
| 5,794,196 A | 8/1998 | Yegnanarayanan et al. | 704/255 |
| 5,797,112 A | 8/1998 | Komatsu et al. | 701/201 |
| 5,799,276 A | 8/1998 | Komissarchik et al. | 704/251 |
| 5,802,510 A | 9/1998 | Jones | 707/2 |
| 5,832,221 A | 11/1998 | Jones | 375/200.36 |
| 5,839,107 A * | 11/1998 | Gupta et al. | 704/270 |
| 5,848,396 A | 12/1998 | Gerace | 705/10 |
| 5,855,000 A | 12/1998 | Waibel et al. | 704/235 |
| 5,867,817 A | 2/1999 | Catallo et al. | 704/255 |
| 5,878,385 A | 3/1999 | Bralich et al. | 704/9 |
| 5,878,386 A | 3/1999 | Coughlin | 704/10 |
| 5,892,813 A | 4/1999 | Morin et al. | 379/88.01 |
| 5,892,900 A | 4/1999 | Ginter et al. | 395/186 |
| 5,895,464 A | 4/1999 | Bhandari et al. | 707/3 |
| 5,895,466 A | 4/1999 | Goldberg et al. | 707/5 |
| 5,897,613 A | 4/1999 | Chan | 704/210 |
| 5,902,347 A | 5/1999 | Backman et al. | 701/200 |
| 5,911,120 A | 6/1999 | Jarett et al. | 455/417 |
| 5,918,222 A | 6/1999 | Fukui et al. | 707/1 |
| 5,926,784 A | 7/1999 | Richardson et al. | 704/9 |
| 5,933,822 A | 8/1999 | Braden-Harder et al. | 707/5 |
| 5,950,167 A | 9/1999 | Yaker | 704/275 |
| 5,953,393 A | 9/1999 | Culbreth et al. | 379/88.25 |
| 5,960,397 A | 9/1999 | Rahim | 704/244 |
| 5,960,399 A | 9/1999 | Barclay et al. | 704/270 |
| 5,960,447 A | 9/1999 | Holt et al. | 707/500 |
| 5,963,894 A | 10/1999 | Richardson et al. | 704/9 |
| 5,963,940 A | 10/1999 | Liddy et al. | 707/5 |
| 5,987,404 A | 11/1999 | Della Pietra et al. | 704/9 |
| 5,991,721 A | 11/1999 | Asano et al. | 704/257 |
| 5,995,119 A | 11/1999 | Cosatto et al. | 345/473 |
| 5,995,928 A | 11/1999 | Nguyen et al. | 704/251 |
| 6,009,382 A | 12/1999 | Martino et al. | 704/1 |
| 6,014,559 A | 1/2000 | Amin | 455/413 |
| 6,018,708 A | 1/2000 | Dahan et al. | 704/244 |
| 6,021,384 A | 2/2000 | Gorin et al. | 704/1 |
| 6,028,514 A | 2/2000 | Lemelson et al. | 340/539 |
| 6,035,267 A | 3/2000 | Watanabe et al. | 704/1 |
| 6,044,347 A | 3/2000 | Abella et al. | 704/272 |
| 6,049,602 A | 4/2000 | Foladare et al. | 379/265 |
| 6,049,607 A | 4/2000 | Marash et al. | 379/410 |
| 6,058,187 A | 5/2000 | Chen | 380/21 |
| 6,067,513 A | 5/2000 | Ishimitsu | 704/233 |
| 6,076,059 A | 6/2000 | Glickman et al. | 704/260 |
| 6,078,886 A | 6/2000 | Dragosh et al. | 704/270 |
| 6,081,774 A | 6/2000 | De Hita et al. | 704/9 |
| 6,085,186 A | 7/2000 | Christianson et al. | 707/3 |
| 6,101,241 A | 8/2000 | Boyce et al. | 379/88.01 |
| 6,108,631 A | 8/2000 | Ruhl | 704/270 |
| 6,119,087 A | 9/2000 | Kuhn et al. | 704/270 |
| 6,122,613 A | 9/2000 | Baker | 704/235 |
| 6,134,235 A | 10/2000 | Goldman et al. | 370/352 |
| 6,144,667 A | 11/2000 | Doshi et al. | 370/401 |
| 6,144,938 A | 11/2000 | Surace et al. | 704/257 |
| 6,154,526 A | 11/2000 | Dahlke et al. | 379/88.03 |
| 6,160,883 A | 12/2000 | Jackson et al. | 379/230 |
| 6,167,377 A | 12/2000 | Gillick et al. | 704/240 |
| 6,173,266 B1 | 1/2001 | Marx et al. | 704/270 |
| 6,173,279 B1 | 1/2001 | Levin et al. | 707/5 |
| 6,175,858 B1 | 1/2001 | Bulfer et al. | 709/206 |
| 6,185,535 B1 | 2/2001 | Hedin et al. | 704/270 |
| 6,188,982 B1 | 2/2001 | Chiang | 704/256 |
| 6,192,110 B1 | 2/2001 | Abella et al. | 379/88.01 |
| 6,192,338 B1 | 2/2001 | Haszto et al. | 704/257 |
| 6,195,634 B1 | 2/2001 | Dudemaine et al. | 704/231 |
| 6,195,651 B1 | 2/2001 | Handel et al. | 707/2 |
| 6,199,043 B1 | 3/2001 | Happ | 704/272 |
| 6,208,964 B1 | 3/2001 | Sabourin | 704/244 |
| 6,208,972 B1 | 3/2001 | Grant et al. | 704/275 |
| 6,219,346 B1 | 4/2001 | Maxemchuk | 370/338 |
| 6,219,643 B1 | 4/2001 | Cohen et al. | 704/257 |
| 6,226,612 B1 | 5/2001 | Srenger et al. | 704/256 |
| 6,233,556 B1 | 5/2001 | Teunen et al. | 704/250 |
| 6,233,559 B1 | 5/2001 | Balakrishnan | 704/275 |
| 6,233,561 B1 | 5/2001 | Junqua et al. | 704/277 |
| 6,236,968 B1 | 5/2001 | Kanevsky et al. | 704/275 |
| 6,246,981 B1 | 6/2001 | Papineni et al. | 704/235 |
| 6,246,990 B1 | 6/2001 | Happ | 704/275 |
| 6,266,636 B1 | 7/2001 | Kosaka et al. | 704/244 |
| 6,269,336 B1 | 7/2001 | Ladd et al. | 704/270 |
| 6,272,455 B1 | 8/2001 | Hoshen et al. | 704/1 |
| 6,275,231 B1 | 8/2001 | Obradovich | 345/349 |
| 6,278,377 B1 | 8/2001 | DeLine et al. | 340/815.4 |
| 6,278,968 B1 | 8/2001 | Franz et al. | 704/3 |
| 6,288,319 B1 | 9/2001 | Catona | 84/609 |
| 6,292,767 B1 | 9/2001 | Jackson et al. | 704/1 |
| 6,301,560 B1 | 10/2001 | Masters | 704/251 |
| 6,308,151 B1 | 10/2001 | Smith | 704/235 |
| 6,314,402 B1 | 11/2001 | Monaco et al. | 704/275 |
| 6,321,196 B1 * | 11/2001 | Franceschi | 704/243 |
| 6,356,869 B1 | 3/2002 | Chapados et al. | 704/275 |
| 6,362,748 B1 | 3/2002 | Huang | 340/901 |
| 6,366,882 B1 | 4/2002 | Bijl et al. | 704/235 |
| 6,366,886 B1 | 4/2002 | Dragosh et al. | 704/270.1 |
| 6,374,214 B1 | 4/2002 | Friedland et al. | 704/235 |
| 6,377,913 B1 | 4/2002 | Coffman et al. | 704/8 |
| 6,381,535 B1 | 4/2002 | Durocher et al. | 701/202 |
| 6,385,596 B1 | 5/2002 | Wiser et al. | 705/51 |
| 6,385,646 B1 | 5/2002 | Brown et al. | 709/217 |
| 6,393,403 B1 | 5/2002 | Majaniemi | 704/275 |
| 6,393,428 B1 | 5/2002 | Miller et al. | 707/102 |
| 6,397,181 B1 * | 5/2002 | Li et al. | 704/256.4 |
| 6,404,878 B1 | 6/2002 | Jackson et al. | 379/221.01 |
| 6,405,170 B1 | 6/2002 | Phillips et al. | 704/270 |
| 6,408,272 B1 | 6/2002 | White et al. | 704/270.1 |
| 6,411,810 B1 | 6/2002 | Maxemchuk | 455/453 |
| 6,411,893 B2 | 6/2002 | Ruhl | 701/207 |
| 6,415,257 B1 | 7/2002 | Junqua et al. | 704/275 |
| 6,418,210 B1 | 7/2002 | Sayko | 379/142.15 |

(56) References Cited

U.S. PATENT DOCUMENTS

| | | | |
|---|---|---|---|
| 6,420,975 B1 | 7/2002 | DeLine et al. | 340/815.4 |
| 6,429,813 B2 | 8/2002 | Feigen | 342/357.13 |
| 6,430,285 B1 | 8/2002 | Bauer et al. | 379/265.01 |
| 6,430,531 B1 | 8/2002 | Polish | 704/257 |
| 6,434,523 B1 | 8/2002 | Monaco | 704/257 |
| 6,434,524 B1 | 8/2002 | Weber | 704/257 |
| 6,434,529 B1* | 8/2002 | Walker et al. | 704/275 |
| 6,442,522 B1 | 8/2002 | Carberry et al. | 704/257 |
| 6,446,114 B1 | 9/2002 | Bulfer et al. | 709/206 |
| 6,453,153 B1 | 9/2002 | Bowker et al. | 455/67.4 |
| 6,453,292 B2 | 9/2002 | Ramaswamy et al. | 704/235 |
| 6,456,711 B1 | 9/2002 | Cheung et al. | 379/265.09 |
| 6,456,974 B1* | 9/2002 | Baker et al. | 704/270.1 |
| 6,466,654 B1 | 10/2002 | Cooper et al. | 379/88.01 |
| 6,466,899 B1 | 10/2002 | Yano et al. | 704/1 |
| 6,470,315 B1 | 10/2002 | Netsch et al. | 704/256 |
| 6,487,494 B2 | 11/2002 | Odinak et al. | 701/202 |
| 6,487,495 B1 | 11/2002 | Gale et al. | 701/209 |
| 6,498,797 B1 | 12/2002 | Anerousis et al. | 370/522 |
| 6,499,013 B1 | 12/2002 | Weber | 704/257 |
| 6,501,833 B2 | 12/2002 | Phillips et al. | 379/88.07 |
| 6,501,834 B1 | 12/2002 | Milewski et al. | 379/93.24 |
| 6,505,155 B1 | 1/2003 | Vanbuskirk et al. | 704/246 |
| 6,510,417 B1 | 1/2003 | Woods et al. | 704/275 |
| 6,513,006 B2 | 1/2003 | Howard et al. | 704/257 |
| 6,522,746 B1 | 2/2003 | Marchok et al. | 379/406.03 |
| 6,523,061 B1 | 2/2003 | Halverson et al. | 709/202 |
| 6,532,444 B1 | 3/2003 | Weber | 704/257 |
| 6,539,348 B1 | 3/2003 | Bond et al. | 704/9 |
| 6,549,629 B2 | 4/2003 | Finn et al. | 381/92 |
| 6,553,372 B1 | 4/2003 | Brassell et al. | 707/5 |
| 6,556,970 B1 | 4/2003 | Sasaki et al. | 704/257 |
| 6,556,973 B1 | 4/2003 | Lewin | 704/277 |
| 6,560,576 B1 | 5/2003 | Cohen et al. | 704/270 |
| 6,560,590 B1* | 5/2003 | Shwe et al. | 706/55 |
| 6,567,778 B1 | 5/2003 | Chao Chang et al. | 704/257 |
| 6,567,797 B1 | 5/2003 | Schuetze et al. | 707/2 |
| 6,570,555 B1 | 5/2003 | Prevost et al. | 345/156 |
| 6,570,964 B1 | 5/2003 | Murveit et al. | 379/67.1 |
| 6,571,279 B1 | 5/2003 | Herz et al. | 709/217 |
| 6,574,597 B1 | 6/2003 | Mohri et al. | 704/251 |
| 6,574,624 B1 | 6/2003 | Johnson et al. | 707/5 |
| 6,578,022 B1 | 6/2003 | Foulger et al. | 706/45 |
| 6,581,103 B1 | 6/2003 | Dengler | 709/231 |
| 6,584,439 B1 | 6/2003 | Geilhufe et al. | 704/270 |
| 6,587,858 B1 | 7/2003 | Strazza | 707/102 |
| 6,591,239 B1 | 7/2003 | McCall et al. | 704/275 |
| 6,594,257 B1 | 7/2003 | Doshi et al. | 370/352 |
| 6,594,367 B1 | 7/2003 | Marash et al. | 381/92 |
| 6,598,018 B1 | 7/2003 | Junqua | 704/251 |
| 6,601,026 B2 | 7/2003 | Appelt et al. | 704/9 |
| 6,604,075 B1 | 8/2003 | Brown et al. | 704/270.1 |
| 6,604,077 B2 | 8/2003 | Dragosh et al. | 704/270.1 |
| 6,606,598 B1 | 8/2003 | Holthouse et al. | 704/275 |
| 6,611,692 B2 | 8/2003 | Raffel et al. | 455/552 |
| 6,614,773 B1 | 9/2003 | Maxemchuk | 370/337 |
| 6,615,172 B1 | 9/2003 | Bennett et al. | 704/257 |
| 6,622,119 B1 | 9/2003 | Ramaswamy et al. | 704/9 |
| 6,629,066 B1 | 9/2003 | Jackson et al. | 704/9 |
| 6,631,346 B1 | 10/2003 | Karaorman et al. | 704/9 |
| 6,631,351 B1 | 10/2003 | Ramachandran et al. | 704/270 |
| 6,633,846 B1 | 10/2003 | Bennett et al. | 704/257 |
| 6,636,790 B1 | 10/2003 | Lightner et al. | 701/33 |
| 6,643,620 B1 | 11/2003 | Contolini et al. | 704/270 |
| 6,650,747 B1 | 11/2003 | Bala et al. | 379/265.06 |
| 6,658,388 B1 | 12/2003 | Kleindienst et al. | 704/275 |
| 6,678,680 B1 | 1/2004 | Woo | 707/6 |
| 6,681,206 B1 | 1/2004 | Gorin et al. | 704/243 |
| 6,691,151 B1 | 2/2004 | Cheyer et al. | 709/202 |
| 6,701,294 B1 | 3/2004 | Ball et al. | 704/257 |
| 6,704,396 B2 | 3/2004 | Parolkar et al. | 379/88.17 |
| 6,704,576 B1 | 3/2004 | Brachman et al. | 455/503 |
| 6,704,708 B1 | 3/2004 | Pickering | 704/235 |
| 6,707,421 B1 | 3/2004 | Drury et al. | 342/357.1 |
| 6,708,150 B1 | 3/2004 | Hirayama et al. | 704/243 |
| 6,721,001 B1 | 4/2004 | Berstis | 348/231.3 |
| 6,721,633 B2 | 4/2004 | Funk et al. | 701/1 |
| 6,721,706 B1 | 4/2004 | Strubbe et al. | 704/275 |
| 6,726,636 B2 | 4/2004 | Der Ghazarian et al. | 600/532 |
| 6,735,592 B1 | 5/2004 | Neumann et al. | 707/101 |
| 6,739,556 B1 | 5/2004 | Langston | 244/189 |
| 6,741,931 B1 | 5/2004 | Kohut et al. | 701/209 |
| 6,742,021 B1 | 5/2004 | Halverson et al. | 709/218 |
| 6,745,161 B1 | 6/2004 | Arnold et al. | 704/7 |
| 6,751,591 B1 | 6/2004 | Gorin et al. | 704/257 |
| 6,751,612 B1 | 6/2004 | Schuetze et al. | 707/4 |
| 6,754,485 B1 | 6/2004 | Obradovich et al. | 455/414.1 |
| 6,754,627 B2 | 6/2004 | Woodward | 704/235 |
| 6,757,544 B2 | 6/2004 | Rangarajan et al. | 455/456.1 |
| 6,757,718 B1 | 6/2004 | Halverson et al. | 709/218 |
| 6,795,808 B1 | 9/2004 | Strubbe et al. | 704/275 |
| 6,801,604 B2 | 10/2004 | Maes et al. | 379/88.17 |
| 6,801,893 B1 | 10/2004 | Backfried et al. | 704/257 |
| 6,813,341 B1 | 11/2004 | Mahoney | 379/88.01 |
| 6,829,603 B1 | 12/2004 | Chai et al. | 707/5 |
| 6,832,230 B1* | 12/2004 | Zilliacus et al. | 455/414.3 |
| 6,833,848 B1 | 12/2004 | Wolff et al. | 345/719 |
| 6,850,603 B1 | 2/2005 | Eberle et al. | 379/88.16 |
| 6,856,990 B2 | 2/2005 | Barile et al. | 707/10 |
| 6,865,481 B2 | 3/2005 | Kawazoe et al. | 701/211 |
| 6,868,380 B2 | 3/2005 | Kroeker | 704/240 |
| 6,868,385 B1 | 3/2005 | Gerson | 704/275 |
| 6,873,837 B1 | 3/2005 | Yoshioka et al. | 455/321 |
| 6,877,001 B2 | 4/2005 | Wolf et al. | 707/3 |
| 6,877,134 B1 | 4/2005 | Fuller et al. | 715/500.1 |
| 6,901,366 B1 | 5/2005 | Kuhn et al. | 704/275 |
| 6,910,003 B1 | 6/2005 | Arnold et al. | 704/4 |
| 6,912,498 B2 | 6/2005 | Stevens et al. | 704/235 |
| 6,915,126 B2 | 7/2005 | Mazzara, Jr. | 455/411 |
| 6,928,614 B1 | 8/2005 | Everhart | 715/728 |
| 6,934,756 B2 | 8/2005 | Maes | 709/227 |
| 6,937,977 B2 | 8/2005 | Gerson | 704/201 |
| 6,937,982 B2 | 8/2005 | Kitaoka et al. | 704/252 |
| 6,944,594 B2 | 9/2005 | Busayapongchai et al. | 704/275 |
| 6,950,821 B2 | 9/2005 | Faybishenko et al. | 707/10 |
| 6,954,755 B2 | 10/2005 | Reisman | 707/10 |
| 6,959,276 B2 | 10/2005 | Droppo et al. | 704/226 |
| 6,961,700 B2* | 11/2005 | Mitchell et al. | 704/235 |
| 6,963,759 B1 | 11/2005 | Gerson | 455/563 |
| 6,964,023 B2 | 11/2005 | Maes et al. | 715/811 |
| 6,968,311 B2 | 11/2005 | Knockeart et al. | 704/270 |
| 6,973,387 B2 | 12/2005 | Masclet et al. | 701/211 |
| 6,975,993 B1 | 12/2005 | Keiller | 704/275 |
| 6,980,092 B2 | 12/2005 | Turnbull et al. | 340/425.5 |
| 6,983,055 B2 | 1/2006 | Luo | 381/313 |
| 6,990,513 B2 | 1/2006 | Belfiore et al. | 709/203 |
| 6,996,531 B2 | 2/2006 | Korall et al. | 704/270 |
| 7,003,463 B1 | 2/2006 | Maes et al. | 704/270.1 |
| 7,016,849 B2 | 3/2006 | Arnold et al. | 704/275 |
| 7,020,609 B2 | 3/2006 | Thrift et al. | 704/270.1 |
| 7,024,364 B2 | 4/2006 | Guerra et al. | 704/270 |
| 7,027,586 B2 | 4/2006 | Bushey et al. | 379/265.09 |
| 7,027,975 B1 | 4/2006 | Pazandak et al. | 704/9 |
| 7,035,415 B2 | 4/2006 | Belt et al. | 381/92 |
| 7,036,128 B1 | 4/2006 | Julia et al. | 719/317 |
| 7,043,425 B2 | 5/2006 | Pao | 704/211 |
| 7,054,817 B2 | 5/2006 | Shao | 704/270 |
| 7,058,890 B2 | 6/2006 | George et al. | 715/728 |
| 7,062,488 B1 | 6/2006 | Reisman | 707/8 |
| 7,069,220 B2 | 6/2006 | Coffman et al. | 704/275 |
| 7,072,834 B2 | 7/2006 | Zhou | 704/244 |
| 7,076,362 B2 | 7/2006 | Ohtsuji et al. | 701/211 |
| 7,082,469 B2 | 7/2006 | Gold et al. | 709/231 |
| 7,085,708 B2 | 8/2006 | Manson | 704/9 |
| 7,092,928 B1 | 8/2006 | Elad et al. | 706/60 |
| 7,107,210 B2 | 9/2006 | Deng et al. | 704/226 |
| 7,107,218 B1 | 9/2006 | Preston | 704/270 |
| 7,110,951 B1 | 9/2006 | Lemelson et al. | 704/270 |
| 7,127,400 B2 | 10/2006 | Koch | 704/270.1 |
| 7,130,390 B2 | 10/2006 | Abburi | 379/88.17 |
| 7,136,875 B2 | 11/2006 | Anderson et al. | 707/104.1 |
| 7,137,126 B1 | 11/2006 | Coffman et al. | 719/328 |
| 7,143,037 B1 | 11/2006 | Chestnut | 704/251 |
| 7,143,039 B1 | 11/2006 | Stifelman et al. | 704/270 |

(56) References Cited

U.S. PATENT DOCUMENTS

| | | | |
|---|---|---|---|
| 7,146,319 B2 | 12/2006 | Hunt | 704/254 |
| 7,149,696 B2 | 12/2006 | Shimizu et al. | 705/1 |
| 7,165,028 B2 | 1/2007 | Gong | 704/233 |
| 7,170,993 B2 | 1/2007 | Anderson et al. | 379/265.09 |
| 7,171,291 B2 | 1/2007 | Obradovich | 701/29 |
| 7,177,798 B2 | 2/2007 | Hsu et al. | 704/9 |
| 7,184,957 B2 | 2/2007 | Brookes et al. | 704/246 |
| 7,190,770 B2 | 3/2007 | Ando et al. | 379/88.01 |
| 7,197,069 B2 | 3/2007 | Agazzi et al. | 375/233 |
| 7,197,460 B1 | 3/2007 | Gupta et al. | 704/270.1 |
| 7,203,644 B2 | 4/2007 | Anderson et al. | 704/246 |
| 7,206,418 B2 | 4/2007 | Yang et al. | 381/92 |
| 7,207,011 B2 | 4/2007 | Mulvey et al. | 715/812 |
| 7,215,941 B2 | 5/2007 | Beckmann et al. | 455/404.1 |
| 7,228,276 B2 | 6/2007 | Omote et al. | 704/243 |
| 7,231,343 B1 | 6/2007 | Treadgold et al. | 704/9 |
| 7,236,923 B1 | 6/2007 | Gupta | 704/9 |
| 7,254,482 B2 | 8/2007 | Kawasaki et al. | 701/211 |
| 7,272,212 B2 | 9/2007 | Eberle et al. | 379/88.17 |
| 7,277,854 B2 | 10/2007 | Bennett et al. | 704/257 |
| 7,283,829 B2 | 10/2007 | Christenson et al. | 455/461 |
| 7,283,951 B2 | 10/2007 | Marchisio et al. | 704/9 |
| 7,289,606 B2 | 10/2007 | Sibal et al. | 379/52 |
| 7,299,186 B2 | 11/2007 | Kuzunuki et al. | 704/270.1 |
| 7,301,093 B2 | 11/2007 | Sater et al. | 84/615 |
| 7,305,381 B1 | 12/2007 | Poppink et al. | 1/1 |
| 7,321,850 B2 | 1/2008 | Wakita | 704/10 |
| 7,328,155 B2 | 2/2008 | Endo et al. | 704/251 |
| 7,337,116 B2 | 2/2008 | Charlesworth et al. | 704/254 |
| 7,340,040 B1 | 3/2008 | Saylor et al. | 379/67.1 |
| 7,366,285 B2 | 4/2008 | Parolkar et al. | 379/88.17 |
| 7,366,669 B2 | 4/2008 | Nishitani et al. | 704/256 |
| 7,376,645 B2 | 5/2008 | Bernard | 707/3 |
| 7,386,443 B1 | 6/2008 | Parthasarathy et al. | 704/201 |
| 7,398,209 B2 | 7/2008 | Kennewick et al. | 704/255 |
| 7,406,421 B2 | 7/2008 | Odinak et al. | 704/275 |
| 7,415,414 B2 | 8/2008 | Azara et al. | 704/270 |
| 7,421,393 B1 | 9/2008 | Di Fabbrizio et al. | 704/275 |
| 7,424,431 B2 | 9/2008 | Greene et al. | 704/270 |
| 7,447,635 B1 | 11/2008 | Konopka et al. | 704/275 |
| 7,451,088 B1 | 11/2008 | Ehlen et al. | 704/270.1 |
| 7,454,608 B2 | 11/2008 | Gopalakrishnan et al. | 713/100 |
| 7,461,059 B2 | 12/2008 | Richardson et al. | 707/5 |
| 7,472,020 B2 | 12/2008 | Brulle-Drews | 701/211 |
| 7,472,060 B1 | 12/2008 | Gorin et al. | 704/240 |
| 7,472,075 B2 | 12/2008 | Odinak et al. | 705/26 |
| 7,477,909 B2 | 1/2009 | Roth | 455/466 |
| 7,478,036 B2 | 1/2009 | Shen et al. | 704/9 |
| 7,487,088 B1 | 2/2009 | Gorin et al. | 704/240 |
| 7,487,110 B2 | 2/2009 | Bennett et al. | 705/26 |
| 7,493,259 B2 | 2/2009 | Jones et al. | 704/257 |
| 7,493,559 B1 | 2/2009 | Wolff et al. | 715/727 |
| 7,502,672 B1 | 3/2009 | Kolls | 701/29 |
| 7,502,738 B2 | 3/2009 | Kennewick et al. | 704/257 |
| 7,516,076 B2 | 4/2009 | Walker et al. | 704/275 |
| 7,529,675 B2 | 5/2009 | Maes | 704/270.1 |
| 7,536,297 B2 | 5/2009 | Byrd et al. | 704/10 |
| 7,536,374 B2 | 5/2009 | Au | 706/55 |
| 7,542,894 B2 | 6/2009 | Murata | 704/9 |
| 7,546,382 B2 | 6/2009 | Healey et al. | 709/246 |
| 7,548,491 B2 | 6/2009 | Macfarlane | 367/198 |
| 7,552,054 B1 | 6/2009 | Stifelman et al. | 704/270 |
| 7,558,730 B2 | 7/2009 | Davis et al. | 704/235 |
| 7,574,362 B2 | 8/2009 | Walker et al. | 704/275 |
| 7,577,244 B2 | 8/2009 | Taschereau | 379/218.01 |
| 7,606,708 B2 | 10/2009 | Hwang | 704/257 |
| 7,620,549 B2 | 11/2009 | Di Cristo et al. | 704/257 |
| 7,634,409 B2 | 12/2009 | Kennewick et al. | 704/257 |
| 7,640,006 B2 | 12/2009 | Portman et al. | 455/412.1 |
| 7,640,160 B2 | 12/2009 | Di Cristo et al. | 704/267 |
| 7,640,272 B2 | 12/2009 | Mahajan et al. | 707/104.1 |
| 7,676,365 B2 | 3/2010 | Hwang | 704/240 |
| 7,676,369 B2 | 3/2010 | Fujimoto et al. | 704/270 |
| 7,684,977 B2 | 3/2010 | Morikawa | 704/211 |
| 7,693,720 B2 | 4/2010 | Kennewick et al. | 704/275 |
| 7,729,916 B2 | 6/2010 | Coffman et al. | 704/270 |
| 7,729,918 B2 | 6/2010 | Walker et al. | 704/275 |
| 7,729,920 B2 | 6/2010 | Chaar et al. | 704/275 |
| 7,734,287 B2 | 6/2010 | Ying | 455/423 |
| 7,748,021 B2 | 6/2010 | Obradovich | 725/105 |
| 7,788,084 B2 | 8/2010 | Brun et al. | 704/7 |
| 7,801,731 B2 | 9/2010 | Odinak et al. | 704/275 |
| 7,809,570 B2 | 10/2010 | Kennewick et al. | 704/257 |
| 7,818,176 B2 | 10/2010 | Freeman et al. | 704/270 |
| 7,831,426 B2 | 11/2010 | Bennett | 704/252 |
| 7,831,433 B1 | 11/2010 | Belvin et al. | 704/275 |
| 7,856,358 B2 | 12/2010 | Ho | 704/270 |
| 7,873,519 B2 | 1/2011 | Bennett | 704/257 |
| 7,873,523 B2 | 1/2011 | Potter et al. | 704/275 |
| 7,873,654 B2 | 1/2011 | Bernard | 707/769 |
| 7,881,936 B2 | 2/2011 | Longe et al. | 704/257 |
| 7,890,324 B2 | 2/2011 | Bangalore et al. | 704/231 |
| 7,894,849 B2 | 2/2011 | Kass et al. | 455/550.1 |
| 7,902,969 B2 | 3/2011 | Obradovich | 340/439 |
| 7,917,367 B2 | 3/2011 | Di Cristo et al. | 704/270.1 |
| 7,920,682 B2 * | 4/2011 | Byrne et al. | 379/88.18 |
| 7,949,529 B2 | 5/2011 | Weider et al. | 704/270 |
| 7,949,537 B2 | 5/2011 | Walker et al. | 704/275 |
| 7,953,732 B2 | 5/2011 | Frank et al. | 707/724 |
| 7,974,875 B1 | 7/2011 | Quilici et al. | 705/14.4 |
| 7,983,917 B2 | 7/2011 | Kennewick et al. | 704/257 |
| 7,984,287 B2 | 7/2011 | Gopalakrishnan et al. | 713/100 |
| 8,005,683 B2 | 8/2011 | Tessel et al. | 704/275 |
| 8,015,006 B2 | 9/2011 | Kennewick et al. | 704/236 |
| 8,060,367 B2 | 11/2011 | Keaveney | 704/247 |
| 8,069,046 B2 | 11/2011 | Kennewick et al. | 704/257 |
| 8,073,681 B2 | 12/2011 | Baldwin et al. | 704/9 |
| 8,077,975 B2 | 12/2011 | Ma et al. | 382/187 |
| 8,082,153 B2 | 12/2011 | Coffman et al. | 704/270 |
| 8,086,463 B2 | 12/2011 | Ativanichayaphong et al. | 704/275 |
| 8,112,275 B2 * | 2/2012 | Kennewick et al. | 704/240 |
| 8,140,327 B2 | 3/2012 | Kennewick et al. | 704/226 |
| 8,140,335 B2 | 3/2012 | Kennewick et al. | 704/257 |
| 8,145,489 B2 | 3/2012 | Freeman et al. | 704/257 |
| 8,150,694 B2 | 4/2012 | Kennewick et al. | 704/257 |
| 8,155,962 B2 | 4/2012 | Kennewick et al. | 704/257 |
| 8,170,867 B2 | 5/2012 | Germain | 704/9 |
| 8,195,468 B2 | 6/2012 | Weider et al. | 704/275 |
| 8,219,399 B2 | 7/2012 | Lutz et al. | 704/270 |
| 8,219,599 B2 | 7/2012 | Tunstall-Pedoe | 707/955 |
| 8,224,652 B2 | 7/2012 | Wang et al. | 704/275 |
| 8,255,224 B2 | 8/2012 | Singleton et al. | 704/275 |
| 8,326,627 B2 | 12/2012 | Kennewick et al. | 704/257 |
| 8,326,634 B2 | 12/2012 | Di Cristo et al. | 704/270.1 |
| 8,326,637 B2 | 12/2012 | Baldwin et al. | 704/275 |
| 8,332,224 B2 | 12/2012 | Di Cristo et al. | 704/257 |
| 8,370,147 B2 | 2/2013 | Kennewick et al. | 704/257 |
| 8,447,607 B2 | 5/2013 | Weider et al. | 704/250 |
| 8,452,598 B2 | 5/2013 | Kennewick et al. | 704/257 |
| 8,509,403 B2 | 8/2013 | Chiu et al. | 379/114.13 |
| 8,515,765 B2 | 8/2013 | Baldwin et al. | 704/275 |
| 8,527,274 B2 | 9/2013 | Freeman et al. | 704/257 |
| 8,589,161 B2 | 11/2013 | Kennewick et al. | 704/252 |
| 8,620,659 B2 | 12/2013 | Di Cristo et al. | 704/257 |
| 2001/0041980 A1 | 11/2001 | Howard et al. | 704/270 |
| 2001/0049601 A1 | 12/2001 | Kroeker et al. | 704/254 |
| 2001/0054087 A1 | 12/2001 | Flom et al. | 709/218 |
| 2002/0015500 A1 | 2/2002 | Belt et al. | 381/66 |
| 2002/0022927 A1 | 2/2002 | Lemelson et al. | 701/301 |
| 2002/0029261 A1 | 3/2002 | Shibata | 709/219 |
| 2002/0032752 A1 | 3/2002 | Gold et al. | 709/218 |
| 2002/0035501 A1 | 3/2002 | Handel et al. | 705/10 |
| 2002/0040297 A1 | 4/2002 | Tsiao et al. | 704/257 |
| 2002/0049535 A1 | 4/2002 | Rigo et al. | 701/211 |
| 2002/0049805 A1 | 4/2002 | Yamada et al. | 709/202 |
| 2002/0065568 A1 | 5/2002 | Silfvast et al. | 700/94 |
| 2002/0067839 A1 | 6/2002 | Heinrich | 381/110 |
| 2002/0069059 A1 | 6/2002 | Smith | 704/257 |
| 2002/0069071 A1 | 6/2002 | Knockeart et al. | 704/275 |
| 2002/0082911 A1 | 6/2002 | Dunn et al. | 705/14 |
| 2002/0087326 A1 * | 7/2002 | Lee et al. | 704/270.1 |
| 2002/0087525 A1 | 7/2002 | Abbott et al. | 707/3 |
| 2002/0107694 A1 | 8/2002 | Lerg | 704/273 |

(56) References Cited

U.S. PATENT DOCUMENTS

| | | |
|---|---|---|
| 2002/0120609 A1 | 8/2002 | Lang et al. .................. 707/1 |
| 2002/0124050 A1 | 9/2002 | Middeljans ................ 709/203 |
| 2002/0133354 A1 | 9/2002 | Ross et al. ................ 704/275 |
| 2002/0133402 A1 | 9/2002 | Faber et al. ................. 705/14 |
| 2002/0135618 A1 | 9/2002 | Maes et al. ................. 345/767 |
| 2002/0138248 A1 | 9/2002 | Corston-Oliver et al. ......... 704/1 |
| 2002/0143532 A1 | 10/2002 | McLean et al. ............. 704/235 |
| 2002/0143535 A1 | 10/2002 | Kist et al. .................. 704/251 |
| 2002/0161646 A1 | 10/2002 | Gailey et al. ................. 705/14 |
| 2002/0173333 A1 | 11/2002 | Buchholz et al. ............. 455/527 |
| 2002/0173961 A1 | 11/2002 | Guerra .................... 704/258 |
| 2002/0184373 A1 | 12/2002 | Maes ...................... 709/228 |
| 2002/0188602 A1 | 12/2002 | Stubler et al. ................. 707/3 |
| 2002/0198714 A1 | 12/2002 | Zhou ...................... 704/252 |
| 2003/0014261 A1 | 1/2003 | Kageyama ................ 704/275 |
| 2003/0016835 A1 | 1/2003 | Elko et al. .................. 381/92 |
| 2003/0046346 A1 | 3/2003 | Mumick et al. ............. 709/205 |
| 2003/0064709 A1 | 4/2003 | Gailey et al. ................ 455/412 |
| 2003/0065427 A1 | 4/2003 | Funk et al. ................... 701/1 |
| 2003/0069734 A1 | 4/2003 | Everhart ................... 704/275 |
| 2003/0088421 A1 | 5/2003 | Maes et al. ............... 704/270.1 |
| 2003/0097249 A1 | 5/2003 | Walker et al. .................. 704/1 |
| 2003/0110037 A1 | 6/2003 | Walker et al. ................ 704/257 |
| 2003/0112267 A1 | 6/2003 | Belrose ..................... 345/728 |
| 2003/0115062 A1 | 6/2003 | Walker et al. ................ 704/258 |
| 2003/0120493 A1 | 6/2003 | Gupta .................... 704/270.1 |
| 2003/0135488 A1 | 7/2003 | Amir et al. ................... 707/3 |
| 2003/0144846 A1* | 7/2003 | Denenberg et al. ............ 704/277 |
| 2003/0158731 A1 | 8/2003 | Falcon et al. ................ 704/231 |
| 2003/0161448 A1 | 8/2003 | Parolkar et al. ............ 379/88.17 |
| 2003/0182132 A1 | 9/2003 | Niemoeller .................. 704/275 |
| 2003/0204492 A1 | 10/2003 | Wolf et al. ................... 707/3 |
| 2003/0206640 A1 | 11/2003 | Malvar et al. ................ 381/93 |
| 2003/0212550 A1 | 11/2003 | Ubale ...................... 704/215 |
| 2003/0212558 A1 | 11/2003 | Matula ..................... 704/260 |
| 2003/0212562 A1 | 11/2003 | Patel et al. ................. 704/275 |
| 2003/0225825 A1 | 12/2003 | Healey et al. ............... 709/203 |
| 2003/0236664 A1 | 12/2003 | Sharma ..................... 704/251 |
| 2004/0006475 A1 | 1/2004 | Ehlen et al. .............. 704/270.1 |
| 2004/0010358 A1 | 1/2004 | Oesterling et al. ............. 701/49 |
| 2004/0025115 A1 | 2/2004 | Sienel et al. ................ 715/513 |
| 2004/0044516 A1 | 3/2004 | Kennewick et al. ............. 704/5 |
| 2004/0098245 A1 | 5/2004 | Walker et al. .................. 704/1 |
| 2004/0117179 A1 | 6/2004 | Balasuriya .................. 704/231 |
| 2004/0117804 A1 | 6/2004 | Scahill et al. ................ 719/324 |
| 2004/0140989 A1 | 7/2004 | Papageorge ................. 345/700 |
| 2004/0158555 A1 | 8/2004 | Seedman et al. ............... 707/3 |
| 2004/0166832 A1 | 8/2004 | Portman et al. .............. 455/412.1 |
| 2004/0167771 A1 | 8/2004 | Duan et al. .................. 704/10 |
| 2004/0172258 A1 | 9/2004 | Dominach et al. ............. 704/277 |
| 2004/0193408 A1 | 9/2004 | Hunt ....................... 704/209 |
| 2004/0193420 A1 | 9/2004 | Kennewick et al. ........... 704/257 |
| 2004/0199375 A1 | 10/2004 | Ehsani et al. .................. 704/4 |
| 2004/0205671 A1 | 10/2004 | Sukehiro et al. ............. 715/532 |
| 2004/0243417 A9 | 12/2004 | Pitts, III et al. .............. 704/276 |
| 2005/0015256 A1 | 1/2005 | Kargman .................. 704/272 |
| 2005/0021334 A1 | 1/2005 | Iwahashi ................... 704/240 |
| 2005/0021470 A1 | 1/2005 | Martin et al. ................ 705/51 |
| 2005/0021826 A1 | 1/2005 | Kumar .................... 709/1232 |
| 2005/0033574 A1 | 2/2005 | Kim et al. .................. 704/251 |
| 2005/0033582 A1 | 2/2005 | Gadd et al. ................. 704/277 |
| 2005/0043940 A1 | 2/2005 | Elder ........................ 704/9 |
| 2005/0114116 A1 | 5/2005 | Fiedler ..................... 704/201 |
| 2005/0125232 A1 | 6/2005 | Gadd ...................... 704/270.1 |
| 2005/0131673 A1 | 6/2005 | Koizumi et al. ................ 704/2 |
| 2005/0137850 A1 | 6/2005 | Odell ........................ 704/4 |
| 2005/0137877 A1 | 6/2005 | Oesterling et al. ............. 704/275 |
| 2005/0143994 A1 | 6/2005 | Mori et al. .................. 704/235 |
| 2005/0216254 A1 | 9/2005 | Gupta et al. ................... 704/9 |
| 2005/0234727 A1 | 10/2005 | Chiu ..................... 704/270.1 |
| 2005/0246174 A1 | 11/2005 | DeGolia .................... 704/270 |
| 2005/0283752 A1 | 12/2005 | Fruchter et al. .............. 717/100 |
| 2006/0041431 A1 | 2/2006 | Maes ................... 704/270.1 |
| 2006/0047509 A1 | 3/2006 | Ding et al. ................. 704/231 |
| 2006/0206310 A1 | 9/2006 | Ravikumar et al. ............... 704/9 |
| 2006/0217133 A1 | 9/2006 | Christenson et al. ......... 455/461 |
| 2006/0285662 A1 | 12/2006 | Yin et al. .................. 379/88.16 |
| 2007/0033005 A1 | 2/2007 | Cristo et al. .................... 704/9 |
| 2007/0033020 A1 | 2/2007 | (Kelleher) Francois et al. ...................... 704/226 |
| 2007/0038436 A1 | 2/2007 | Cristo et al. .................... 704/9 |
| 2007/0043569 A1 | 2/2007 | Potter, III et al. ............. 704/270 |
| 2007/0043574 A1 | 2/2007 | Coffman et al. .............. 704/275 |
| 2007/0043868 A1 | 2/2007 | Kumar et al. ................ 709/226 |
| 2007/0050191 A1 | 3/2007 | Weider et al. ............... 704/275 |
| 2007/0055525 A1 | 3/2007 | Kennewick et al. ........... 704/257 |
| 2007/0061067 A1 | 3/2007 | Zeinstra et al. ............. 701/200 |
| 2007/0061735 A1 | 3/2007 | Hoffberg et al. ............. 715/744 |
| 2007/0073544 A1 | 3/2007 | Millett et al. ................ 704/277 |
| 2007/0078708 A1 | 4/2007 | Yu et al. ..................... 705/14 |
| 2007/0078709 A1 | 4/2007 | Rajaram .................... 705/14 |
| 2007/0118357 A1 | 5/2007 | Kasravi et al. ................ 704/10 |
| 2007/0135101 A1 | 6/2007 | Ramati et al. .............. 455/414.1 |
| 2007/0146833 A1 | 6/2007 | Satomi et al. ............... 358/537 |
| 2007/0162296 A1 | 7/2007 | Altberg et al. ................. 705/1 |
| 2007/0179778 A1 | 8/2007 | Gong et al. ................... 704/9 |
| 2007/0186165 A1 | 8/2007 | Maislos et al. ............... 715/728 |
| 2007/0198267 A1 | 8/2007 | Jones et al. ................. 704/257 |
| 2007/0203736 A1 | 8/2007 | Ashton ....................... 705/1 |
| 2007/0214182 A1 | 9/2007 | Rosenberg ............... 707/104.1 |
| 2007/0250901 A1 | 10/2007 | McIntire et al. ............. 725/146 |
| 2007/0265850 A1 | 11/2007 | Kennewick et al. ........... 704/257 |
| 2007/0299824 A1 | 12/2007 | Pan et al. ..................... 707/3 |
| 2008/0034032 A1 | 2/2008 | Healey et al. ............... 709/203 |
| 2008/0065386 A1 | 3/2008 | Cross et al. ................. 704/270 |
| 2008/0091406 A1 | 4/2008 | Baldwin et al. ................. 704/4 |
| 2008/0103761 A1 | 5/2008 | Printz et al. ................... 704/9 |
| 2008/0109285 A1 | 5/2008 | Reuther et al. ................. 705/7 |
| 2008/0115163 A1 | 5/2008 | Gilboa et al. ................ 725/34 |
| 2008/0133215 A1 | 6/2008 | Sarukkai ..................... 704/2 |
| 2008/0140385 A1 | 6/2008 | Mahajan et al. ................ 704/9 |
| 2008/0147410 A1 | 6/2008 | Odinak .................. 704/270.1 |
| 2008/0177530 A1 | 7/2008 | Cross et al. ................... 704/4 |
| 2008/0189110 A1 | 8/2008 | Freeman et al. ............. 704/251 |
| 2008/0235023 A1 | 9/2008 | Kennewick et al. ........... 704/257 |
| 2008/0235027 A1 | 9/2008 | Cross .................... 704/270.1 |
| 2008/0319751 A1 | 12/2008 | Kennewick et al. ........... 704/257 |
| 2009/0052635 A1 | 2/2009 | Jones et al. ............... 379/88.02 |
| 2009/0067599 A1 | 3/2009 | Agarwal et al. ............ 379/114.21 |
| 2009/0076827 A1 | 3/2009 | Bulitta et al. ............... 704/275 |
| 2009/0106029 A1 | 4/2009 | DeLine et al. .............. 704/275 |
| 2009/0117885 A1 | 5/2009 | Roth ..................... 455/414.3 |
| 2009/0144271 A1 | 6/2009 | Richardson et al. ............. 707/5 |
| 2009/0150156 A1 | 6/2009 | Kennewick et al. ........... 704/257 |
| 2009/0216540 A1 | 8/2009 | Tessel et al. ................ 704/275 |
| 2009/0271194 A1 | 10/2009 | Davis et al. ................ 704/235 |
| 2009/0273563 A1 | 11/2009 | Pryor ...................... 345/157 |
| 2009/0276700 A1 | 11/2009 | Anderson et al. ............. 715/700 |
| 2009/0299745 A1 | 12/2009 | Kennewick et al. ........... 704/257 |
| 2009/0307031 A1 | 12/2009 | Winkler et al. ................. 705/7 |
| 2009/0313026 A1 | 12/2009 | Coffman et al. .............. 704/275 |
| 2010/0023320 A1 | 1/2010 | Di Cristo et al. ................ 704/9 |
| 2010/0029261 A1 | 2/2010 | Mikkelsen et al. ............ 455/419 |
| 2010/0036967 A1 | 2/2010 | Caine et al. ................. 709/236 |
| 2010/0049501 A1 | 2/2010 | Kennewick et al. .............. 704/9 |
| 2010/0049514 A1 | 2/2010 | Kennewick et al. ........... 704/233 |
| 2010/0057443 A1 | 3/2010 | Di Cristo et al. ................ 704/9 |
| 2010/0063880 A1 | 3/2010 | Atsmon et al. ............. 705/14.53 |
| 2010/0145700 A1 | 6/2010 | Kennewick et al. ........... 704/257 |
| 2010/0185512 A1 | 7/2010 | Borger et al. ............. 705/14.49 |
| 2010/0204986 A1 | 8/2010 | Kennewick et al. ........... 704/226 |
| 2010/0204994 A1 | 8/2010 | Kennewick et al. ........... 704/257 |
| 2010/0217604 A1 | 8/2010 | Baldwin et al. .............. 704/275 |
| 2010/0286985 A1 | 11/2010 | Kennewick et al. ........... 704/257 |
| 2010/0299142 A1 | 11/2010 | Freeman et al. ................. 704/9 |
| 2010/0312566 A1 | 12/2010 | Odinak et al. ............... 704/275 |
| 2011/0112827 A1 | 5/2011 | Kennewick et al. .............. 704/9 |
| 2011/0112921 A1 | 5/2011 | Kennewick et al. .......... 705/26.1 |
| 2011/0131036 A1 | 6/2011 | Di Cristo et al. ................ 704/9 |
| 2011/0131045 A1 | 6/2011 | Cristo et al. ................ 704/249 |
| 2011/0231182 A1 | 9/2011 | Weider et al. .................. 704/9 |
| 2011/0231188 A1 | 9/2011 | Kennewick et al. ........... 704/236 |
| 2012/0022857 A1 | 1/2012 | Baldwin et al. ................. 704/9 |
| 2012/0101809 A1 | 4/2012 | Kennewick et al. .............. 704/9 |

(56) References Cited

U.S. PATENT DOCUMENTS

| | | | |
|---|---|---|---|
| 2012/0101810 | A1 | 4/2012 | Kennewick et al. ............... 704/9 |
| 2012/0109753 | A1 | 5/2012 | Kennewick et al. ....... 705/14.58 |
| 2012/0150636 | A1 | 6/2012 | Freeman et al. ........... 705/14.49 |
| 2012/0278073 | A1 | 11/2012 | Weider et al. ................. 704/235 |
| 2013/0054228 | A1 | 2/2013 | Baldwin et al. .................... 704/9 |
| 2013/0211710 | A1 | 8/2013 | Kennewick et al. .......... 701/419 |
| 2013/0253929 | A1 | 9/2013 | Weider et al. ................. 704/235 |
| 2013/0297293 | A1 | 11/2013 | Di Cristo et al. ................. 704/9 |
| 2013/0304473 | A1 | 11/2013 | Baldwin et al. ............... 704/257 |
| 2013/0339022 | A1 | 12/2013 | Baldwin et al. ............... 704/257 |
| 2014/0012577 | A1 | 1/2014 | Freeman et al. .............. 704/249 |

FOREIGN PATENT DOCUMENTS

| | | |
|---|---|---|
| WO | WO 99/46763 | 9/1999 |
| WO | WO 00/21232 | 4/2000 |
| WO | WO 00/46792 | 8/2000 |
| WO | WO 2004/072954 | 8/2001 |
| WO | WO 01/78065 | 10/2001 |
| WO | WO 2007/019318 | 2/2007 |
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | WO 2009/145796 | 12/2009 |
| WO | WO 2010/096752 | 8/2010 |

OTHER PUBLICATIONS

Reuters, "IBM to Enable Honda Drivers to Talk to Cars", Charles Schwab & Co., Inc., Jul. 28, 2002, 1 page.

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media", *IEEE Aeroso, Electron. Systems Magazine*, vol. 14, No. 9, Sep. 1999, pp. 27-32.

Zhao, Yilin, "Telematics: Safe and Fun Driving", *IEEE Intelligent Systems*, vol. 17, Issue 1, 2002, pp. 10-14.

Chai et al., "Mind: A Semantics-Based Multimodal Interpretation Framework for Conversational System", *Proceedings of the International CLASS Workshop on Natural, Intelligent and Effective Interaction in Multimodal Dialogue Systems*, Jun. 2002, pp. 37-46.

Cheyer et al., "Multimodal Maps: An Agent-Based Approach", *International Conference on Cooperative Multimodal Communication* (CMC/95), May 24-26, 1995, pp. 111-121.

Elio et al., "On Abstract Task Models and Conversation Policies" in Workshop on Specifying and Implementing Conversation Policies, *Autonomous Agents '99*, Seattle, 1999, 10 pages.

Turunen, "Adaptive Interaction Methods in'Speech User Interfaces", Conference on Human Factors in Computing Systems, Seattle, Washington, 2001, pp. 91-92.

Mao, Mark Z., "Automatic Training Set Segmentation for Multi-Pass Speech Recognition", Department of Electrical Engineering, Stanford University, CA, copyright 2005, IEEE, pp. 1-685 to 1-688.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/poocile-redefines-car-pps-navigation-qoople-maps-navigation-android/>, Oct. 28, 2009, 4 pages.

Bazzi, Issam et al., "Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.

O'Shaughnessy, Douglas, "Interacting with Computers by Voice: Automatic Speech Recognition and Synthesis", *Proceedings of the IEEE*, vol. 91, No. 9, Sep. 1, 2003, XP011100665, pp. 1272-1305.

* cited by examiner

AGENT ARCHITECTURE FOR DETERMINING MEANINGS OF NATURAL LANGUAGE UTTERANCES

This application is a continuation of U.S. patent application Ser. No. 11/747,547, May 11, 2007 entitled "Systems and Methods for Responding to Natural Language Speech Utterance," which issued as U.S. Pat. No. 7,502,738 on Mar. 10, 2009, and which is a divisional of U.S. patent application Ser. No. 10/452,147, Jun. 3, 2003 entitled "Systems and Methods for Responding to Natural Language Speech Utterance," which issued as U.S. Pat. No. 7,398,209 on Jul. 8, 2008, and which claims priority from U.S. Provisional Patent Application Ser. No. 60/384,388, filed Jun. 3, 2002, the disclosures of which are hereby incorporated by reference in their entirety.

BACKGROUND OF THE INVENTION

1. Field of the Invention

The present invention relates to the retrieval of online information or processing of commands through a speech interface. More specifically, the invention is a fully integrated environment allowing users to submit natural language speech questions and commands. Information that is sought may be obtained from a wide range of disciplines, making local and network queries to obtain the information, and presenting results in a natural manner even in cases where the question asked or the responses received are incomplete, ambiguous or subjective. The invention may further allow users to control devices and systems either locally or remotely using natural language speech commands.

2. Background of the Related Art

A machine's ability to communicate with humans in a natural manner remains a difficult problem. Cognitive research on human interaction shows that a person asking a question or giving a command typically relies heavily on context and the domain knowledge of the person answering. On the other hand, machine-based queries (e.g., questions, commands, requests, and/or other types of communications) may be highly structured and are not inherently natural to the human user. Thus, human questions and machine processing of queries may be fundamentally incompatible. Yet the ability to allow a person to make natural language speech-based queries remains a desirable goal.

Much work covering multiple methods has been done in the fields of natural language processing and speech recognition. Speech recognition has steadily improved in accuracy and today is successfully used in a wide range of applications. Natural language processing has previously been applied to the parsing of speech queries. Yet, current systems are generally unable to provide a complete environment for users to make natural language speech queries and receive natural sounding responses. There remains a number of significant barriers to creation of a complete natural language speech-based query and response environment.

SUMMARY OF THE INVENTION

According to an aspect of the invention, one object of the invention is to overcome these and other drawbacks of prior systems.

According to one aspect of the invention, in order for machines (e.g., computer devices) to properly respond to a question and/or a command that is in a natural language form, machine processable queries and commands may be formulated after the natural language question and/or command has been parsed and interpreted.

In another aspect of the invention, systems are provided which may overcome the deficiencies of prior systems through the application of a complete speech-based information query, retrieval, presentation and command environment. This environment makes maximum use of context, prior information, domain knowledge, and user specific profile data to achieve a natural environment for one or more users making queries or commands in multiple domains. Through this integrated approach, a complete speech-based natural language query and response environment may be created. Further, at each step in the process, accommodation may be made for full or partial failure and graceful recovery. The robustness to partial failure is achieved through the use of probabilistic and fuzzy reasoning at several stages of the process. This robustness to partial failure promotes the feeling of a natural response to questions and commands.

According to another aspect of the invention, the system comprises a speech unit interface device that receives spoken natural language queries, commands and/or other utterances from a user, and a computer device or system that receives input from the speech unit and processes the input (e.g., retrieves information responsive to the query, takes action consistent with the command and performs other functions as detailed herein). The system may further generate a natural language speech response in response to the user and/or generate a natural language speech message without any prompting from a user such as an alert message.

According to another aspect of the invention, the speech unit may be incorporated into the computer device or system, or may be a separate structure. If a separate structure, the speech unit may be connected to the computer device via a wired or wireless connection. If a wireless connection, a base unit may be connected to the computer, internally or externally, to communicate with the speech unit.

According to another aspect of the invention, the computer device or system may comprise a stand alone or networked PC, a PDA or other portable computer device, or other computer device or system. For convenience, these and other computer alternatives shall be referred to simply as a computer. One aspect of the invention comprises software that is installed onto the computer, where the software comprises one or more of the following modules: a speech recognition module for capturing the user input; a parser for parsing the input, a text to speech engine module for converting text to speech; a network interface for enabling the computer to interface with one or more networks; a graphical user interface module; and an event manager for managing events. Preferably, the event manager is in communication with a dictionary and phrases module, a user profile module that enables user profiles to be created, modified, and accessed, a personality module that enables various personalities to be created and used, an agent module, an update manager, and one or more databases.

According to another aspect of the invention domain specific behavior and information is organized into agents. Agents are autonomous executables that receive, process and respond to user questions, queries, and commands. The agents provide complete, convenient and re-distributable packages or modules of functionality, typically for a specific domain or application. Agents can be complete packages of executable code, scripts, links to information, and other forms of communication data, required to provide a specific package of functionality, usually in a specific domain. In other words, an agent includes everything that is needed to extend the functionality of the invention to a new domain. Further, agents and their associated data can be updated remotely over a network as new behavior is added or new information becomes available. Agents can use system resources and the services of other, typically more specialized, agents. Agents can be distributed and redistributed in a number of ways including on removable storage media, transfer over networks or attached to emails and other messages. An update manager is used to add new agents to the system or update existing agents.

According to another aspect of the invention, license management capabilities allowing the sale of agents by third parties to one or more users on a one time or subscription basis may be provided. In addition, users with particular expertise may create agents, update existing agents by adding new behaviors and information, and making these agents for other users.

In order to enhance the natural query and response environment, the system may format results in a manner enhancing the understandability to the user. The optimal formatting and presentation depends on the context of the questions, the contents of the response being presented, the history of the interaction with the user, the user's preferences and interests and the nature of the domain. Information presented in a rigid, highly formatted, or structured manner seems unnatural to most people. Thus a system simulates some aspects of human "personality". In some cases, the presentation of the response and the terms used are randomized so they do not appear rigidly formatted or mechanical. The use of other simulated personality characteristics is also desirable. For example, a response that may be upsetting to the user is best presented in a sympathetic manner. Finally, the results of many queries are long text strings, lists, tables or other lengthy sets of data. Natural presentation of this type of information presents particular challenges. Simply reading the long response is generally not preferred. Therefore the system parses the most important sections from the response and, at least initially, only reports these. Determining what parts of a long response are presented depends on the context of the questions, the contents of the response being presented, the history of the interaction with the user, the user's preferences and interests and the nature of the domain. At the same time the system gives the user interactive control over what information and how much information is being presented, to stop the response all together, or to take other actions.

According to another aspect of the invention, the system may process and respond to both questions or queries and commands. Keywords or context are used to determine if the user's utterance is a command or query. Some utterances can include both aspects of a command and a query or question. For example, a user may say, "record my favorite TV program". A query is required to determine the name, the channel, and time for the users favorite TV program. A command must be executed to set a video recorder to capture this program.

For each user utterance including a question or query or set of questions or queries, the system may perform multiple steps possibly including:

capture of the user's question or query through accurate speech recognition operating in a variety of real-world environments;

parse and interpret the question or query;

determine the domain of expertise required and context, invoking the proper resources, including agents;

formulate one or more queries to one or more local and/or network data sources or sending appropriate commands to local or remote devices or the system itself;

perform required formatting, variable substitutions and transformations to modify the queries to a form most likely to yield desired results from the available sources;

execute the multiple queries or commands in an asynchronous manner and dealing gracefully with failures;

extract or scrape the desired information from the one or more results, which may be returned in any one of a number of different formats;

evaluate and interpret the results, including processing of errors, gathered and combine them into a single best result judged to be "best" even if the results are ambiguous, incomplete, or conflicting;

perform required formatting, variable substitutions and transformations to modify the results to a form most easily understood by the user; and present the compound result, through a text to speech engine, to the user in a useful and expected manner.

The above steps preferably are performed while accounting for the domain of expertise required, the context for the question or command, domain specific information, the history of the user's interaction, user preferences, information sources or commands available, and responses obtained from the sources. At each stage probabilistic or fuzzy set decision and matching methods can be applied to deal with inconsistent, ambiguous, conflicting and incomplete information or responses. In addition, the use of asynchronous queries that may result in rapid and graceful failure of some queries or commands may allow the system to robustly return results quickly and in a manner that seems natural to the user.

Many everyday questions are inherently subjective and result in answers that are a matter of option or consensus as much as fact. Such questions are often ad hoc in their nature, as well. The system, according to another aspect of the invention, may use probabilistic and fuzzy set decision and matching methods to first identify the subjective nature of the question and to evaluate a range of possible answers, selecting the one answer or few answers that best represent the type of result desired by the user. The context and expected results from a particular question may be highly dependent on the individual asking the question. Therefore, the system may create, store and use extensive personal profile information for each user. Information in the profile may be added and updated automatically as the user uses the system or may be manually added or updated by the user or by others. Domain specific agents may collect, store and use specific profile information, as may be required for optimal operations. Users can create commands for regularly used reports, automatically generated alerts, and other queries and for the formatting and presentation of results. The system may use profile data in interpreting questions, formulating queries, interpreting results of queries and presenting answers to the user. Examples of information in a user profile includes, history of questions asked, session histories, formatting and presentation preferences, special word spelling, terms of interest, special data sources of interest, age, sex, education, location or address, place of business, type of business, investments, hobbies, sports interests, news interests and other profile data.

To create a natural question and response environment, the system according to one aspect of the invention, may attempt to provide rapid responses without requiring any additional information. The system may determine the mostly likely context or domain for a user's question or command, for example, by using a real-time scoring system or other technique. Based on this determination, the system may invoke the correct agent. The agent makes one or more queries and rapidly returns a formatted response. Thus, a user can receive a direct response to a set of questions, each with a different response or context. In some cases, the available information, including the query results, may not adequately answer the question. In such a situation, the user may be asked one or more questions to resolve the ambiguity. Additional queries may then be made before an adequate response is made. In these cases, the system may use context information, user profile information and domain specific information to minimize the interaction with the user required to deliver a response.

If the confidence level of the domain or context score is not high enough to ensure a reliable response, the system can request that the user verify the question or command is correctly understood. In general, the question may be phrased to indicate the context of the question including all criteria or parameters. If the user confirms that the question is correct the system may proceed to produce a response. Otherwise, either the user can rephrase the original question, perhaps adding additional information to remove ambiguity, or the system may ask one or more questions to attempt to resolve the ambiguity or other actions may taken.

Although the system, according to another aspect of the invention, is intended to be able to accept most any natural language question or command, ambiguity can still be a problem. To assist users formulate concise questions and commands the system may support a voice query language. The language may help users clearly specify the keywords or contexts of the question or command along with the parameters or criteria. The system may provide built in training capabilities to help the user learn the best methods to formulate their questions and commands.

In order to make the responses to user's questions and commands seem more natural, the system may employ one or more dynamically invokeable personalities. Personalities have specific characteristics, which simulate the behavioral characteristics of real humans. Examples of these characteristics include, sympathy, irritation, and helpfulness. The personality also randomizes aspects of responses, just as a real human would do. This behavior includes randomization of terms used and the order of presentation of information. Characteristics of the personality are invoked using probabilistic or fuzzy set decision and matching methods, and using criteria including the context for the question, the history of the user's interaction, user preferences, information sources available, responses obtained from the sources.

According to another aspect of the invention, special procedures to present information that is in the form of long text strings, tables, lists or other long response sets may be employed. Simply presenting a long set of information in an ordered manner is not natural nor what most users have in mind. The system, using for example, probabilistic or fuzzy set matching methods, may extract the most relevant information to the user and presents these subsets first. Further the system may provide commands allowing the user to skip through the list, find keywords or key information in the list or stop processing the list altogether.

In addition to the ability to process user questions and commands, the invention may provide local or remote control functions for the system or for other devices. Users may initiate commands locally or remotely. Several techniques for executing remote operations are possible, for example, the use of a telephone or other audio connection. Other remote command techniques may be used. The processing of these commands is performed in a nearly identical manner to a question. One difference being that the result of the command is generally an action rather than a response. Examples of control operations supported by the invention include, finding and playing music, film, games or other entertainment media, control of the appliances or other electronic or electro-mechanical devices, security systems control, audio, text and video conferencing (including Voice over IP conferencing), operating integrated messaging environments and other control operations. By using an optional analog or digital telephone interface or a data network interface, the invention can provide remote control capability of the computer or and auxiliary devices connected to the computer. For example, if the computer is connected via an interface to one or more auxiliary devices, a remote user can use this capability to remotely control or program the operation of the auxiliary device. For example, this enables recording of a television program, checking the status of a home security system, checking voice mail messages, hearing and responding to email messages, and much more. For each user command utterance the system may execute a number of steps possibly including:

capture the user's command through accurate speech recognition operating in a variety of real-world environments;

parse and interpret the command;

determine the domain for the command and context, invoking the proper resources, including agents;

formulate device specific commands for the system or external devices;

route command to system, or external devices, including external devices connected to data networks;

receive and process results of command, including errors; and optionally, provide response to user indicating the success or failure of the command, and possibly including state information.

The system may be used in conjunction with a wide range of platform environments. These environments include, as a peripheral to a PC, a portable or wearable computer or other computer, embedded in a PC or other computer, on a personal digital assistant (e.g., a PDA with wireless networking capability, in a specialized device such as a bar code scanner or payment terminal, on a wireless telephone, or other platforms). If the invention is used with a mobile or portable device that has position location capability, the location data can be used by the invention as part of the context for user questions. A user may use the system on one or more devices. In this case history and profile information for the user may be synchronized between the multiple devices on a periodic basis or other basis.

According to another aspect of the invention, the system may be deployed in a network of devices using common base of agents, data, information, user profiles and histories. Each user can then interact with, and receive the same services and applications at any location equipped with the required device on the network. For example, multiple devices on which the invention is deployed, and connected to a network, can be placed at different locations throughout a home, place of business or other location. In such a case, the system may use the location of the particular device addressed by the user as part of the context for the questions asked.

Multiple users may use the system at different times or during interleaved or overlapping sessions. The system recognizes the user either by name or voice. Once the user is recognized, the system invokes the correct profile. If multiple users are addressing the system in overlapping or interleaved sessions, the system determines which user is stating each question or command and applies the correct profile and context. For applications requiring security, the user is verified, typically by using voiceprint matching or requesting a password or pass-phrase from the user. When multiple users are engaged in interleaved sessions, the system gracefully resolves conflicts using a probabilistic or fuzzy set decision method. This process simulates the manner in which a human would address multiple questions. For example, the system may answer short questions first at times, while answering questions in the order received at other times.

Given the desire for domain specific behavior, user specific behavior and domain specific information, the system, according to another aspect of the invention, may allow both users and content providers to extend the system capabilities, add data to local data sources, and add references to network data sources. To allow coverage of the widest possible range of topics, the system allows third party content developers to develop, distribute and sell specialized or domain specific system programs and information. Content is created though creation of new agents, scripting existing agents, adding new data to agents or databases and adding or modifying links to information sources. Distribution of this information is sensitive to the users interests and use history and to their willingness to pay or not.

According to another aspect of the invention, the system may allow users to disseminate their knowledge without programming. The system may include mechanisms that allow users to post and distribute agents and information in their particular areas of expertise, to improve system capability. Further, users can extend the system and configure it to their own preferences, add information to their profile to define new questions or queries, extend and modify existing questions and queries, add new data sources, update data sources, set preferences and specify presentation parameters for results.

Since the invention may operate in many environments, including environments with background noise, point noise sources and people holding conversations, filtering of speech input may be performed. The invention may use, for example, either one-dimensional or two-dimensional array microphones to receive human speech. The array microphones can be use fixed or employ dynamic beam forming techniques. The array pattern may be adjusted to maximize gain in the direction of the user and to null point noise sources. Speech received at the microphones may then be processed with analog or digital filters to optimize the bandwidth, cancel echoes, and notch-out narrow band noise sources. Following filtering, the system may use variable rate sampling to maximize the fidelity of the encoded speech, while minimizing required bandwidth. This procedure may be particularly useful in cases where the encoded speech is transmitted over a wireless network or link.

Some example applications for the invention include but are not limited to the following:

white pages and yellow pages lookups to find email addresses, telephone numbers, street addresses and other information for businesses and individuals;
personal address book, calendars and reminders for each user;
automatic telephone dialing, reading and sending emails and pages by voice and other communications control functions;
map, location and direction applications;
movie or other entertainment locator, review information and ticket purchasing;
television, radio or other home entertainment schedule, review information and device control from a local or remote user;
weather information for the local area or other locations;
stock and other investment information including, prices, company reports, profiles, company information, business news stories, company reports, analysis, price alerts, news alerts, portfolio reports, portfolio plans, etc.;
flight or other scheduled transportation information and ticketing;
reservations for hotels, rental cars and other travel services;
local, national and international news information including headlines of interest by subject or location, story summaries, full stories, audio and video retrieval and play for stories;
sports scores, news stories, schedules, alerts, statistics, back ground and history information, etc.;
ability to subscribe interactively to multimedia information channels, including sports, news, business, different types of music and entertainment, applying user specific preferences for extracting and presenting information;
rights management for information or content used or published;
horoscopes, daily jokes and comics, crossword puzzle retrieval and display and related entertainment or diversions;
recipes, meal planning, nutrition information and planning, shopping lists and other home organization related activities;
as an interface to auctions and online shopping, and where the system can manage payment or an electronic wallet;
management of network communications and conferencing, including telecommunications, email, instant messaging, Voice over IP communications and conferencing, local and wide area video and audio conferencing, pages and alerts;
location, selection, management of play lists and play control of interactive entertainment from local or network sources including, video on demand, digital audio, such as MP3 format material, interactive games, web radio and video broadcasts;
organization and calendar management for families, businesses and other groups of users including the management of, meetings, appointments, and events; and
interactive educational programs using local and network material, with lesson material level set based on user's profile, and including, interactive multimedia lessons, religious instruction, calculator, dictionary and spelling, language training, foreign language translation and encyclopedias and other reference material.

It will be appreciated that the foregoing statements of the features of the invention are not intended as exhaustive or limiting, the proper scope thereof being appreciated by reference to this entire disclosure and reasonably apparent variations and extensions thereof.

BRIEF DESCRIPTION OF THE DRAWINGS

The invention will be described by reference to the preferred and alternative embodiments thereof in conjunction with the drawings in which.

DETAILED DESCRIPTION OF THE PREFERRED EMBODIMENTS

The fact that most natural language queries are incomplete in their definition is a significant barrier to natural human query-response interaction between humans and machines. Further, some questions can only be interpreted in the context of previous questions, knowledge of the domain, or the user's history of interests and preferences. Thus, some natural language questions may not be easily transformed to machine processable form. Compounding this problem, many natural language questions are ambiguous or subjective. In these cases, the formation of a machine processable query and returning of a natural language response is difficult at best.

In order for machines (e.g., computer devices) to properly respond to a question or a command that is in a natural language form, machine processable queries and commands may be formulated after the natural form question or command has been parsed and interpreted. Depending on the nature of the question or command, there may not be a simple set of queries and commands that will return an adequate response. Several queries and commands may need to be initiated and even these queries and commands may need to be chained or concatenated to achieve a complete result. Further, no single available source may contain the entire set of results required. Thus multiple queries and/or commands, perhaps with several parts, may be needed for multiple data sources, which can be both local or on a network. Not all of these sources, queries and/or commands will return useful results or any results at all. Useful results that are returned are often embedded in other information, and from which they may need to be extracted. For example, a few key words or numbers often need to be "scraped" from a larger amount of other information in a text string, table, list, page or other information. At the same time, other extraneous information such as graphics or pictures needs to be removed to process the response. In any case, the multiple results must be evaluated and combined to form the best possible answer, even in the case where some queries do not return useful results or fail entirely. In cases where the question is ambiguous or the result inherently subjective, determining the best result to present is a complex process. Finally, to maintain a natural interaction, responses need to be returned rapidly to the user. Managing and evaluating complex and uncertain queries while maintaining real-time performance is a significant challenge.

The following detailed description refers to the accompanying drawings, and describes exemplary embodiments of the present invention. Other embodiments are possible and modifications may be made to the exemplary embodiments without departing from the spirit, functionality and scope of the invention. Therefore, the following detailed descriptions are not meant to limit the invention.

Figure 1:
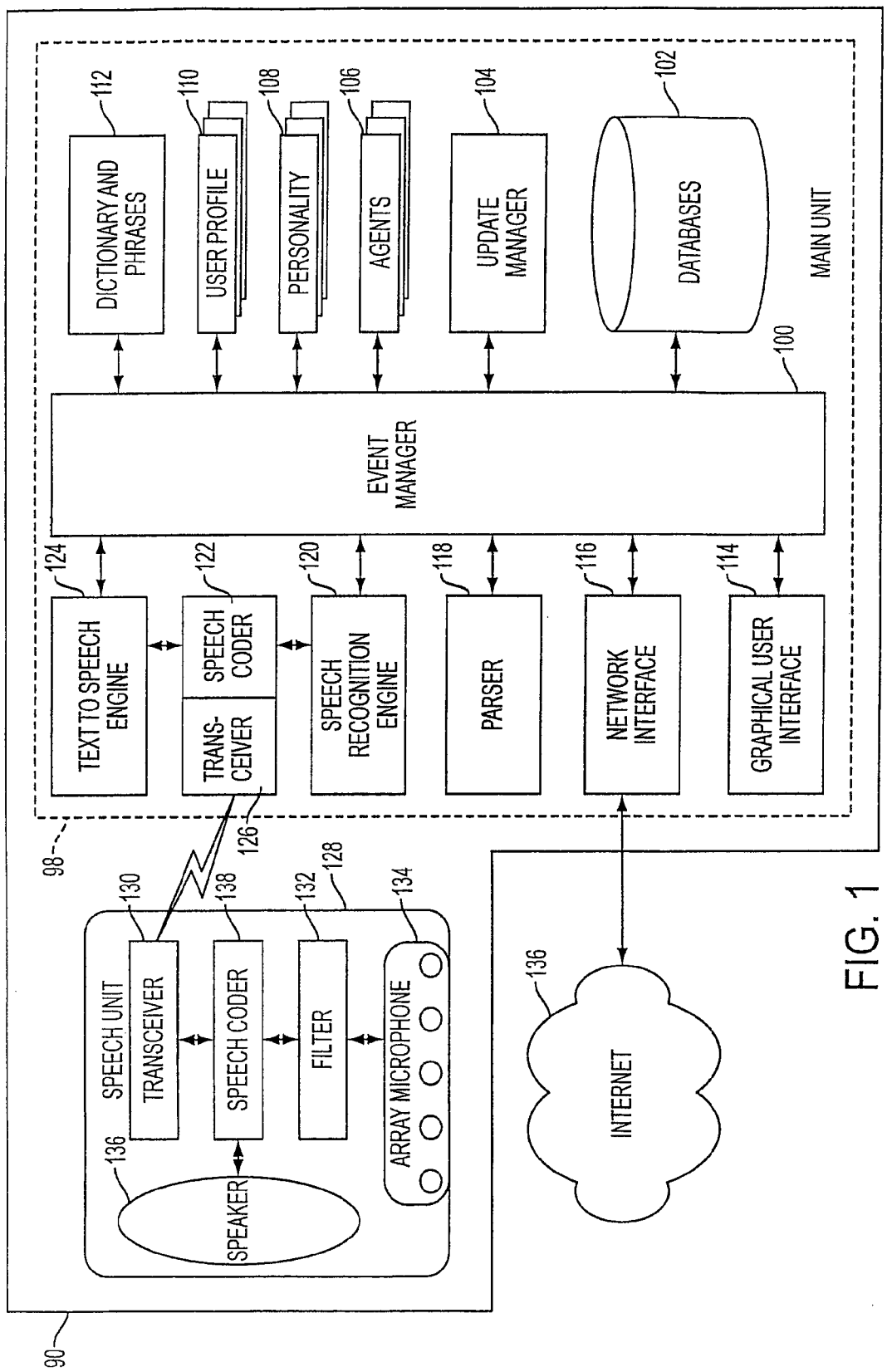
FIG. 1 is an overall diagrammatic view according to one embodiment of the invention.

The present invention provides a complete speech-based information query, retrieval, processing and presentation environment. In addition, the invention may be useful for control of the system itself and/or external devices. This integrated environment makes maximum use of context, prior information and domain and user specific profile data to achieve a natural environment for one or more users making queries or stating commands in multiple domains. Through this integrated approach, a complete speech-based natural language query, command and response environment may be created. FIG. 1 shows a schematic diagram view of a system 90 according to an embodiment of the invention.

The system 90 may include a main unit 98 and a speech unit 128. Alternatively, the system 98 may only comprise of the main unit 98, the speech unit 128 being a completely separate system. The event manager 100 may mediate interactions between other components of the main unit 98. The event manager 100 provides a multi-threaded environment allowing the system 98 to operate on multiple commands or questions from multiple user sessions without conflict and in an efficient manner, maintaining realtime response capabilities.

Agents 106 contain packages of both generic and domain specific behavior for the system 98. Agents 106 may use nonvolatile storage for data, parameters, history information, and locally stored content provided in the system databases 102 or other local sources. User specific data, parameters, and session and history information that may determine the behavior of agents 106 are stored in one or more user profiles 110. Data determining system personality characteristics for agents are stored in the one or more personality module 108. The update manager 104 manages the automatic and manual loading and updating of agents 106 and their associated data from the Internet 136 or other network through the network interface 116.

The main user interface for the system 90, according to an embodiment of the invention, is through one or more speech units 128. The speech unit 128 includes one or more microphones, for example array microphone 134, to receive the utterances of the user. The speech received at the microphone 134 may be processed by filter 132 and passed to the speech coder 138 for encoding and compression. In one embodiment, a transceiver module 130 transmits the coded speech to the main unit 98. Coded speech received from the main unit 98 is detected by the transceiver 130, then decoded and decompressed by the speech coder 138 and annunciated by the speaker 136.

The one or more speech units 128 and the main unit 98 may communicate over a communication link. The communication link can include a wired or wireless link. According to one embodiment, the communication link comprises an RF link. The transceiver 130 on the speech unit communicates coded speech data bi-directionally over the communication link with the transceiver 126 on the main unit 98. According to another embodiment, RF link may use any standard local area wireless data protocols including the IEEE 802.11, Bluetooth or other standards. Alternatively, an infrared data link conforming to any suitable standard such as IrDA or other infrared standards can be used. In an alternative embodiment, wires connect the speech unit 128 and the main unit 98, eliminating the need for one speech coder 138. Other wired or wireless analog or digital transmission techniques can be used.

Coded speech received at the transceiver 126 on the main unit 98 is passed to the speech coder 122 for decoding and decompression. The decoded speech is processed by the speech recognition engine 120 using data in the dictionary and phrases module 112 and received from the agents 106. The recognized words and phrases are processed by the parser 118, which transforms them into complete commands and questions using data supplied by an agent[s] 106. The agent[s] 106 then process the commands or questions. The agent[s] 106 create queries to local databases 102 or though the network interface 116 to data sources on the Internet 136 or other networks. Commands typically result in actions taken by the system 90 itself (i.e., pause or stop), or to a remote device or data source (i.e., download data or program, or control a remote device), through the network interface to the Internet or other data interface.

The agents 106 return results of questions as responses to users. The response may be created using the results of information queries, the system personality 108 and the user preferences or other data in the user profile 110. The agents 106 generally present these results using the speech unit 128. The agents 106 create a response string, which is sent to the text to speech engine 124. The text to speech engine 124 creates the required utterances, which may be encoded and compressed by the speech coder 122. Once coded, the utterances are transmitted from the main unit 98 by the transceiver 126 to the transceiver 130 on the speech unit 128. The utterance is then decoded and decompressed by the speech coder 138 and output by the speaker 136.

The graphical user interface 114 can be used as a substitute or complement to the speech interface. For example, the graphical user interface 114 can be used to view and interact with graphical or tabular information in a manner more easily digested by the user. The graphical user interface can show system state and history in a more concise manner than the speech interface. Users can use the graphical user interface to create or extend agents 106. These operations can include scripting of agents, adding data to the agent or databases 102 used by the agent, adding links to information sources.

Figure 2:
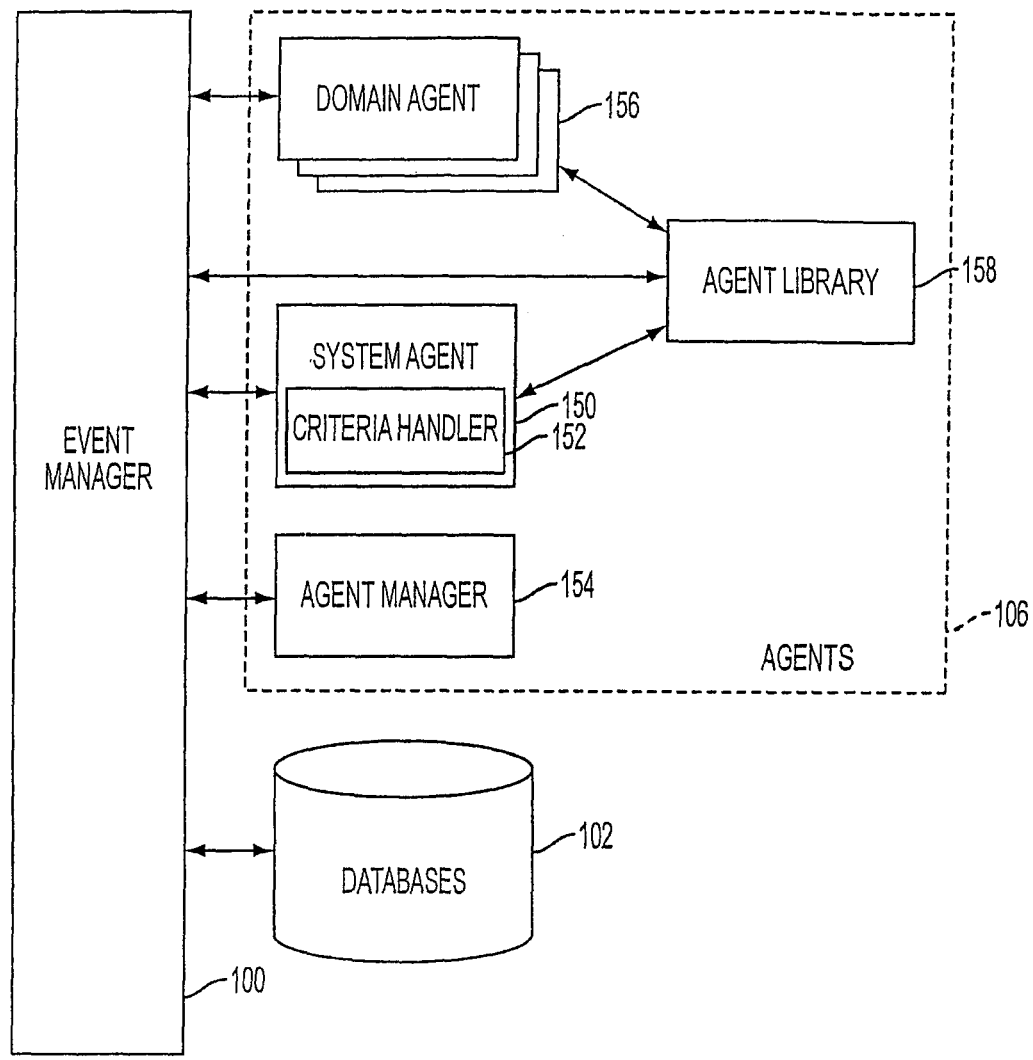
FIG. 2 is a schematic block diagram showing the agent architecture according to one embodiment of the invention.

The system 90 may comprise of different types of agents. In one embodiment of the invention, generic and domain specific behavior and information may be organized into domain agents. A system agent, on the other hand, provides default functionality and basic services. The domain specific agents provide complete, convenient and re-distributable packages or modules for each application area. In other words, a domain agent includes everything needed to extend or modify the functionality of the system 90 in a current or new domain. Further, domain agents and their associated data can be updated remotely over a network as new behavior is added or new information becomes available. Domain agents may use the services of other, typically more specialized, agents and the system agent. Agents are distributed and redistributed in a number of ways including on removable storage media, transfer over networks or attached to emails and other messages. The invention may provide license management capability allowing the sale of agents by third parties to one or more users on a one time or subscription basis. In addition, users with particular expertise may create agents, update existing agents by adding new behaviors and information and making these agents to other users. A block diagram of an agent architecture according to an embodiment of the invention is shown in FIG. 2.

Agents 106 receive and return events to the event manager 100. Both system agents 150 and domain agents 156 receive questions and commands from the parser 118. Based on keywords in the questions and commands and the structures of the questions and commands, the parser invokes the required agent[s]. Agents use the nonvolatile storage for data, parameters, history information and local content provided in the system databases 102. When the system starts-up or boots-up the agent manager 154 may load and initialize the system agent 150 and the one or more domain agents 156. At shutdown the agent manager unloads the agents. The agent manager 154 also performs license management functions for the domain agents 156 and content in the databases 102.

The system agent 150 manages the criteria handlers 152, which handle specific parameters or values (criteria) used to determine context for questions and commands. Both the system agent 150 and the domain agents 156 use the criteria handlers 152. The various domain agents 156 can use the services of the system agent 150 and of other, typically more specialized, domain agents 156. The system agent 150 and the domain agents 156 use the services of the agent library 158, which contains utilities for commonly used functions. The library may include utilities for text and string handling, network communications, database lookup and management, fuzzy and probabilistic evaluation, text to speech formats, and other utilities.

Domain agents 156 can be data-driven, scripted or created with compiled code. A base of generic agent is used as the starting point for data-driven or scripted agents. Agents created with compiled code are typically built into dynamically linkable or loadable libraries. Developers of agents can add new functionality to the agent library 158 as required. Details of agent distribution and update, and agent creation or modification are discussed in sections below.

The invention, according to another embodiment of the invention, may provide capabilities to distribute and update system agents 150, domain agents 156, agent library components 158, databases 102, and dictionary and phrase entries 112 over wireless or wired networks 136, including dial-up networks using the update manager 104. The network interface 116 may provide connections to one or more networks. The update manager 104 may also manages the downloading and installation of core system updates. The agent manager 154 may perform license management functions for the domain agents and the databases. The update manager 104 and agent manager 154 may perform these functions for all agents and database content including, agents and content available to all users or agents and content only available to certain users. Examples of agent and database components added or updated on a periodic basis include:

agents for new domains;
additional domain knowledge for agents;
new keywords for a domain, which can include names of politicians, athletes, entertainers, names of new movies or songs, etc. who have achieved recent prominence;
links to a preferred set of information sources for the domains covered including links for, entertainment, news, sports, weather, etc.;
updates to domain information based on, for example, changes to tax laws, company mergers, changing political boundaries; and
updates to content, including dictionaries, encyclopedias and almanacs; and
other content and database components.

When a user requires or selects a new domain agent 156 or database element 102, the update manager 104 may connect to their source on the network 136 though the network interface 116, download and install the agent or data. To save system resources and to comply with any license conditions, the update manager 104 may uninstall agents that are no longer in use. In one embodiment of the invention, the update manager 104 periodically queries one or more sources of the licensed agents and database components to locate and download updates to agent executables, scripts or data as they become available. Alternatively, the agent sources may initiate the downloading of agent updates of the registered or licensed agents to the update manager as they become available.

The agent manager 154 may provide a license management client capable of executing most any license terms and conditions. When a particular agent 106 and/or database element 102 is required by a command, the agent manager 154 verifies that the use of the agent or data element is within the allowed terms and conditions, and if so, invokes the agent or allows access to the data element. License management schemes that can be implemented through the agent manager 154 include outright purchase, subscription for updates, one time or limited time use. Use of shared agents and data elements (such as those downloaded from web sites maintained by groups of domain experts) may also be managed by the agent manager 154.

If a question or command requires an agent, currently not loaded on the system, the agent manager 154 may search the network 136 through the network interface 116 to find a source for a suitable agent. Once located, the agent can be loaded under the control of the update manager 104, within the terms and conditions of the license agreement as enforced by the agent manger.

New commands, keywords, information, or information sources can be added to any domain agent 156 by changing agent data or scripting. These configuration capabilities may allow users and content developers to extend and modify the behavior of existing domain agents 156 or to create new domain agents 156 from a generic agent without the need to create new compiled code. Thus, the modification of the domain agents 156 may range from minor data-driven updates by even the most casual users, such as specifying the spelling of words, to development of complex behavior using the scripting language as would typically be done by a domain expert. The user can create and manage modifications to domain agents 156 through speech interface commands or using a graphical user interface 114. User-specific modifications of domain agents 156 are stored in conjunction with the user's profile 110 and accessed by the domain agent 156 at run-time.

The data used to configure data driven agents 156 are structured in a manner to facilitate efficient evaluation and to help developers with organization. These data are used not only by the agents 156, but also by the speech recognition engine 120, the text to speech engine 124, and the parser 118. Examples of some major categories of data include:

1. Content packages include questions or commands. Each command or question or group of commands or questions includes contexts used for creation of one or more queries. The agent 156 passes a regular grammar expression to the parser 118 for evaluation of a context or question. An initial or default context is typically supplied for each command or question. The command or question includes a grammar for the management and evaluation of the context stack.
2. Page lists or pointers to other local or network content sources. For each page or content source there is a pointer (e.g. URL, URI, or other pointer) to the page or source. Each page has specific scraping information used to extract the data of interest. The scraping information includes matching patterns, HTML or other format parsing information.
3. A response list, determining the response of the agent 156 to a particular command or question given the context, the user profile and the information retrieved. Responses can include diagnostic error messages or requests for more information if the question or command cannot yet be resolved from the known information. Responses can be based on or dependent on thresholds or probabilistic or fuzzy weights for the variables.
4. Substitution lists containing variable substitutions and transformations, often applied by the agents 150, 156 in the formatting of queries and results. For example, a stock domain specific agent 156 would use a substitution list of company trading symbols, company names and commonly used abbreviations. Substitutions and transformations can be performed on commands and questions to create precise queries, which can be applied against one or more information sources or to results for creating more meaningful output to the user. Substitution lists also include information for optimally dealing with structured information, such as HTTP formatted page parsing and evaluation.
5. Personalities used for responses. Personalities are constructed by combining multiple traits in a weighted manner. Weights can be specified for each agent's domain area to create one or more specific personalities. Examples of personality traits include, sarcasm, humor, irritation, and sympathy, and other traits.
6. Public and user specific parameters for sources, substitutions, transformations, variables or criteria. The public parameter lists are part of the agent package 156. The user specific parameters are contained in the user profile 110.

Commands and questions are interpreted, queries formulated, responses created and results presented based on the users personal or user profile 110 values. Personal profiles may include information specific to the individual, their interests, their special use of terminology, the history of their interactions with the system, and domains of interest. The personal profile data may be used by the agents 106, the speech recognition engine 120, the text to speech engine 124, and the parser 118. Preferences can include, special (modified) commands, past behavior or history, questions, information sources, formats, reports, and alerts. User profile data can be manually entered by the user and/or can be learned by the system 90 based on user behavior. User profile values may include:

spelling preferences;
date of birth for user, family and friends;
income level;
gender;
occupation;
location information such as, home address, neighborhood, and business address;
car type;
telecommunications and other service providers and services;
financial and investment information;
synonyms (i.e., a nick name for someone);
special spelling;
keywords;
transformation or substitution variables;
domains of interest; and
other values.

End users may use the data driven agent 156 extension and modification facilities and values stored in user profiles 110 to create special reports, packages of queries, alerts and output formats. A single alert or report can be configured to use multiple data sources, values, and other variables (i.e., time, location, etc.) to condition or otherwise determine when an alert should be sent. For example, an alert can be generated by sampling a stock price every fifteen minutes and sending an alert if the price drops below some value. To create a report, the user first specifies a set of commands or questions. Next, the user creates or selects a format for the report. Finally the user may name the report. A report can have variable parameters. For example, a user may create a company stock report, and execute the report by stating its name and the company name, which gives the user selected information and in a specified format for that company. In another example, a user can create a "morning" report, which presents selected multimedia information from different sources (news, sports, traffic, weather) in the order and formats desired. Alerts and reports can be created using only voice commands and responses, commands and responses through the graphical user interface 114, or a combination of the two. To create a report, alert, or other specialized behavior, the user performs a number of steps including:

- specify the command to run a report or alert;
- specify the question or questions, including keywords, used for a query;
- set the criteria for running the report such as on command or when a particular condition is met;
- define preferred information sources;
- define preferences for order of result evaluation by source, value, etc.;
- specify the presentation medium for a report or alert, such as an email, the text to speech engine, a message to a pager, or a text and graphics display; and
- specify the preferred format for the report, such as information to be presented, order of information to be presented, preferred abbreviations or other variable substitutions.

Filtering and noise elimination may be important in facilitating the various functionalities of the system 90. The accurate recognition and parsing of the user's speech requires the best possible signal to noise ratio at the input to the speech recognition engine 120. To accomplish the required improvements an array microphone 134 and a filter 132 are employed. According to an embodiment of the invention, the microphone array, filters and speech coder 138 are physically separated from the main unit 98 into a speech unit 128, and connected using a wireless link. Since bandwidth on a wireless connection is at a premium, the speech coder dynamically adapts the digitization rate and compression of the captured speech.

The speech unit 128 may use an array of microphones 134 to provide better directional signal capture and noise elimination than can be achieved with a single microphone. The microphone array can be one-dimensional (a linear array) or two-dimensional (a circle, square, triangle or other suitable shape). The beam pattern of the array can be fixed or made adaptive though use of analog or digital phase shifting circuitry. The pattern of the active array is steered to point in the direction of the one or more users speaking. At the same time nulls can be added to the pattern to notch out point or limited area noise sources. The use of the array microphone also helps reduce the cross talk between output from the text to speech engine 124 through the speaker 136 and detection of the user's speech.

The microphone can be complemented with an analog or digital (i.e., Voice over IP) speech interface. This interface allows a remote user to connect to the system and interact with it in the same manner possible if they were physically present.

The speech unit 128, according to an embodiment of the invention, may use an analog or digital filter 132 between the array microphone 134 and the speech coder 138. The pass band of the filter is set to optimize the signal to noise ratio at the input to the speech recognition engine 120. In some embodiments, the filter is adaptive, using band shaping combined with notch filtering to reject narrow-band noise. In one embodiment of the invention, the system 90 may employ adaptive echo cancellation in the filter. The echo cancellation helps prevent cross talk between output from the text to speech engine and detection of the user's speech as well as suppression of environmentally caused echoes. Algorithms comparing the background noise to the signal received from the user's speech are used to optimize the band-shaping parameters of the adaptive filter. Those skilled in the art will be familiar with multiple techniques used to construct suitable digital and analog filters.

The speech received by the array microphone 134 and passed through the filter 132 may be sent to the speech digitizer or coder 138. The speech coder 138 may use adaptive lossy audio compression to optimize bandwidth requirements for the transmission of the coded speech to the speech recognition engine 120 over a wireless link. The lossy coding may be optimized to preserve only the components of the speech signal required for optimal recognition. Further, the lossy compression algorithms that may be used may be designed to prevent even momentary gaps in the signal stream, which can cause severe errors in the speech recognition engine. The digitized speech may be buffered in the coder and the coder may adapt the output data rate to optimize the use of the available bandwidth. The use of the adaptive speech coder is particularly advantageous when a band-limited wireless link is used between the coder and the speech recognition engine.

In an alternative embodiment, the array microphone can be replaced by a set of physically distributed microphones or a headset worn by the user. The distributed microphones can be placed in different parts of a room or in different rooms. The distributed microphones can create a three-dimensional array to improve signal to noise ratio. The headset may use a wireless or wired connection.

While the invention is intended to be able to accept most any natural language question or command, ambiguity can still be a problem. To assist users formulate concise questions and commands the system 90 may support a voice query language. The language is structured to allow a variety of queries with minimal ambiguity. Thus, the voice query language helps users clearly specify the keywords or contexts of the question or command along with the parameters or criteria. The language provides a grammar to clearly specify the keyword used to determine the context and a set of one or criteria or parameters. A user asking a question or stating a command in the voice query language is nearly always guaranteed to receive a response.

The voice query language may be sensitive to the contents of the context stack. Thus, a following-on question can be asked using an abbreviated grammar, since keywords and criteria can be inherited from the stack. For example, the user can simply ask about another keyword if the criteria of the question remain constant.

The system 90, may provide built in training capabilities to help the user learn the best methods to formulate their questions and commands. The interactive training allows the user to audibly or visibly see the machine interpretation of their queries and provides suggestions on how to better structure a query. Using the interactive training a user can quickly become comfortable with the voice query language and at the same time learn how to optimize the amount of information required with each step of a dialog.

The output of the speech coder 122 may be fed to the speech recognition engine 120. The speech recognition engine 120 recognizes words and phrases, using information in the dictionary and phrase tables 112, and passes these to the parser 118 for interpretation. The speech recognition engine 120 may determine the user's identity by voice and name for each utterance. Recognized words and phrases may be tagged with this identity in all further processing. Thus, as multiple users engage in overlapping sessions, the tags added by the speech recognition engine 120 to each utterance allows other components of the system 90 to tie that utterance to the correct user and dialog. The user recognition capability may further be used as a security measure for applications, such as auctions or online shopping, where this is required. Voice characteristics of each user may be contained in the user profile 110.

A user may start a dialog with the system 90 when they first address it. This can be done by speaking a generic word ("computer") or addressing a specific name ("Fred"), which may be generally tied to a system personality 108. Once the user starts the dialog, it may be recognized by the speech recognition engine 120, using unique characteristics of the user's speech. At the end of a dialog or to interrupt a dialog, the user may utter a dismissal word ("good bye").

According to another embodiment of the invention, the system 90 may employ a speech recognition engine 120 seeding for improved word recognition accuracy, using data from the dictionary and phrase tables 112, user profiles 110, and the agents 106. At the same time, the fuzzy set possibilities or prior probabilities for the words in the dictionary and phrase tables may be dynamically updated to maximize the probability of correct recognition at each stage of the dialog. The probabilities or possibilities may be dynamically updated based on a number of criteria including the application domain, the questions or commands, contexts, the user profile and preferences, user dialog history, the recognizer dictionary and phrase tables, and word spellings.

For uncommon words or new vocabulary words, a user may be given the option to spell the words. The spelling may be done by saying the names or the letters or using a phonetic alphabet. The phonetic alphabet can be a default one or one of the user's choosing.

Alternatively, when a user uses a word that is not recognized at all or is not correctly recognized by the speech recognition engine 120 then the user may be asked to spell the word. The speech recognition engine 120 determines this condition based on confidence level for the scoring process. The word is looked up in the dictionary 112 and the pronunciation for the word is added to either the dictionary, the agent 106, or the user's profile 110. The word pronunciation can then be associated with the domain, the question, the context and the user. Though this process the speech recognition engine learns with time and improves accuracy. To assist users in spelling words an individualized phonetic alphabet can be used. Each user can modify the standard phonetic alphabets with words, which they can remember more easily.

Once the words and phrases have been recognized by the speech recognition engine 120, the tokens and user identification is passed to the parser 118. The parser 118 examines the tokens for the questions or commands, context and criteria. The parser 118 determines a context for an utterance by applying prior probabilities or fuzzy possibilities to keyword matching, user profile 110, and dialog history. The context of a question or command determines the domain and thereby, the domain agent 156, if any, to be evoked. For example, a question with the keywords "temperature" implies a context value of weather for the question. The parser dynamically receives keyword and associated prior probability or fuzzy possibility updates from the system agent 150 or an already active domain agent 156. Based on these probabilities or possibilities the possible contexts are scored and the top one or few are used for further processing.

The parser 118 uses a scoring system to determine the mostly likely context or domain for a user's question and/or command. The score is determined from weighting a number of factors, including the user profile 110, the domain agent's data content, and previous context. Based on this scoring, the system 90 invokes the correct agent. If the confidence level of the score is not high enough to ensure a reliable response, the system 90 may ask the user to verify whether the question and/or command is correctly understood. In general, the question that is asked by the system 90 may be phrased to indicate the context of the question including all criteria or parameters. For example, the question can be in the form of: "Did I understand that you want such-and-such?" If the user confirms that the question is correct the system proceeds to produce a response. Otherwise, the user can rephrase the original question, perhaps adding additional information to remove ambiguity, or the system can ask one or more questions to attempt to resolve the ambiguity.

Once the context for the question or command has been determined, the parser 118 can invoke the correct agent 156, 150. To formulate a question or command in the regular grammar used by agents, the parser 118 may determine required and optional values for the criteria or parameters. These criteria may have been explicitly supplied by the user or may need to be inferred. The parser 118 makes use of the criteria handlers 152 supplied by the system agent 150. The criteria handlers 152 provide context sensitive procedures for extracting the criteria or parameters from the user's question or command. Some criteria are determined by executing algorithms in the agent, while others may be determined by applying probabilistic of fuzzy reasoning to tables of possible values. Prior probabilities or fuzzy possibilities and associated values are received from a number of sources including the history of the dialog, the user profile 110, and the agent. Based on user responses, the prior probabilities or fuzzy possibilities are updated as the system learns the desired behavior. For a weather context, examples of criteria include, location, date and time. Other criteria can include command criteria (i.e., yes/no, on/off, pause, stop), and spelling. Special criteria handlers are available from the system agent for processing lists, tables, barge-in commands, long strings of text and system commands.

The criteria handlers 152 operate iteratively or recursively on the criteria extracted to eliminate ambiguity. This processing helps reduce the ambiguity in the user's question or command. For example, if the user has a place name (or other proper noun) in their utterance the parser 118 can use services of the domain agent 156 to look up tables in the databases 102 for place names or can attempt to determine which word is the proper noun from the syntax of the utterance. In another example, the user asks "what about flight one hundred and twenty too?". The parser and domain agent use flight information in the database and network information along with context to determine the most plausible interpretation among; flight 100 and flight 20 also, flight 100 and flight 22, flight 122, and the like.

Once the context and the criteria are determined, the parser 118 may form the question or command in a standard format or hierarchical data structure used for processing by the agents 150, 156. The parser 118 may fill in all required and some optional tokens for the grammar of the context. Often the tokens must be transformed to values and forms acceptable to the agents. The parser obtains the required transformations from the agents, dialog history or user profile 110. Examples of transformations or substitutions performed by the parser on tokens include:

substituting a stock symbol for a company name or abbreviation;
substituting a numerical value for a word or words;
adding a zip code to an address; and
changing a place or other name to a commonly used standard abbreviation.

The agents 150, 156 may receive a command or question once the parser 118 has placed it in the required standard format. Based on the context, the parser 118 evokes the correct agent to process the question or command.

Commands can be directed to the system 90 or to an external entity. System commands are generally directed to the system agent 150. Commands for external entities are generally processed by a domain agent 156, which includes the command context and behavior for the external entity.

Specific questions are generally directed to one of the domain agents 156. Based on the question or context and the parameters or criteria, the domain agent creates one or more queries to one or more local or external information sources. Questions can be objective or subjective in nature. Results for objective questions can often be obtained by structured queries to one or more local or network information sources. Even for objective questions, the system 90 may need to apply probabilistic or fuzzy set analysis to deal with cases of conflicting information or incomplete information. Information to answer subjective questions is generally obtained by one or more ad-hoc queries to local or network data sources, followed by probabilistic or fuzzy set evaluation of the one results to determine a best answer.

Once the domain agent 156 has formulated the one or more queries, they may be sent to local and/or network information sources. The queries are performed in an asynchronous manner to account for the fact that sources respond at different speeds or may fail to respond at all. Duplicate queries are sent to different information sources to ensure that at least one source responds with a useful result in a timely manner. Further, if multiple results are received in a timely manner, they can be scored by the system to determine which data is most reliable or appropriate. Examples of data sources accommodated include, HTTP data sources, sources with meta-data in various formats including XML, entertainment audio, video and game files including MP3, databases using query languages and structured responses such as SQL, and other data sources.

The local information sources can be stored in one or more system databases 102 or can be on any local data storage such as a set of CDs or DVDs in a player or other local data storage. Network information sources can be connected to the Internet 136 or other network and accessed through a series of plug-ins or adaptors, known as pluggable sources, in the network interface 116. The pluggable sources in the network interface 116 may be capable of executing the protocols and interpreting the data formats for the data sources of interest. The pluggable sources may provide information scraping data and procedures for each source to the domain agents 156. If a new type of data source is to be used, a new plug-in or adaptor can be added to the network interface 116.

The domain agent 156 evaluates the results of the one or more queries as they arrive. The domain agent 156 scores the relevance of the results based on results already received, the context, the criteria, the history of the dialog, the user profile 110 and domain specific information using probabilistic or fuzzy scoring techniques. Part of the dialog history is maintained in a context stack. The weight of each context for the scoring is based on the relevance of one context to another and the age of the contexts. Other scoring variables can be associated through the context stack. Contexts can also be exclusive, so that previous contexts have no weight in the scoring.

Based on the continuous scoring processes, the domain agent 156 may determine if a single best answer can be extracted. For most questions the desired result has a set of tokens that must be found to formulate an answer. Once a value has been found for each of these tokens the results are ready for presentation to the user. For example, for a question on weather, the tokens can include the date, day of week, predicted high temperature, predicted low temperature, chance of precipitation, expected cloud cover, expected type of precipitation and other tokens. Results processed in this manner include error messages. For subjective questions this determination is made by determining a most likely answer or answers, extracted by matching of the results received. If no satisfactory answer can be inferred from the results of the query the agent can do one of the following:

1. Ask the user for more information, typically through the speech interface, and based on the results obtained formulate new queries. This approach is applied when an irresolvable ambiguity arises in the formulation of a response.
2. Formulate new queries based on the results received from the first set of queries. This approach is typically applied in cases where the responses received do not contain all the required information. Information sources to query can be inferred from the results already obtained (i.e., links in an HTML document) or from other sources. Using this approach one or more sets of queries and responses can be chained without the need for action by the user.
3. Wait for additional queries to return results.

In any case, the domain agent 156 may continue to make queries and evaluate results until a satisfactory response is constructed. In doing so, the agent can start several overlapping query paths or threads of inquiry, typically mediated by the event manager 100. This technique, combined with the use of asynchronous queries from multiple data sources provides the real-time response performance required for a natural interaction with the user.

The domain agent 156 may apply conditional scraping operations to each query response as it is received. The conditional scraping actions depend on the context, the criteria, user profile 110, and domain agent coding and data. For each token to be extracted, a scraping criteria 152 may be created using the services of the system agent 150. The scraping criteria use format specific scraping methods including, tables, lists, text, and other scraping methods. One or more scraping criteria can be applied to a page or results set. Once additional results are received, the domain agent 156 can create new scraping criteria to apply to results already acquired. The conditional scraping process removes extraneous information, such as graphics, which need not be further processed or stored, improving system performance.

The domain agent 156 may strongly influence how the results are presented. For instance, once the domain agent 156 has created a satisfactory response to a question, the agent 156 may format that response for presentation. Typically, the domain agent 156 formats the response into the markup format used by the text to speech engine 124. The domain agent 156 may also format the result presentation using available format templates and based on the context, the criteria, and the user profile 110. Variable substitutions and transformations may be performed by the agent 156 to produce a response best understood and most natural to the user. Further, the order of presentation of tokens and the exact terminology used to create a more natural response to the user may be varied by the agent 156. The domain agent 156 may also select the presentation personality 108 to be used.

The domain agent 156, may select the presentation template, determine order of presentation for tokens and determine variable substitutions and transformations using probabilistic or fuzzy set decision methods. The template used to form the presentation can be from the domain agent itself or from the user profile 110. The user profile 110 can completely specify the presentation format or can be used to select and then modify an existing presentation format. Selection and formatting of presentation template can also depend on the presentation personality modules 108. At the same time, the characteristics of the personality used for the response are dynamically determined using probabilities or fuzzy possibilities derived from the context, the criteria, the domain agent itself and the user profile 110.

The domain agent 156 may apply a number of transformations to the tokens before presentation to the user. These variable substitutions and transformations are derived from a number of sources including, domain information carried by the agent, the context, the token values, the criteria, the personality module 108 to be used, and the user profile 110. Examples of variable substitutions and transformations include:

substitution of words for numbers;
 substitution of names for acronyms or symbols (i.e., trading symbols);
 use of formatting information derived from the information sources (i.e., HTML tags);
 nature of the response including, text, long text, list, table;
 possible missing information or errors;
 units for measurement (i.e., English or metric); and
 preferred terminology from the user profile 110 or presentation personality 108.

The system 90, according to another embodiment of the invention, may provide special purpose presentation capabilities for long text strings, tables, lists and other large results sets. Domain agents 156 may use special formatting templates for such results. The system agent 150 may provide special criteria handlers 152 for presentation and user commands for large results sets. The presentation templates used by the domain agents 156 for large results sets typically include methods for summarizing the results and then allowing the user to query the result in more detail. For example, initially only short summaries, such as headlines or key numbers, are presented. The user can then query the results set further. The criteria handlers 152 provide users with the capability to browse large results sets. Commands provided by the criteria handlers 152 for large results sets include, stop, pause, skip, rewind, start, and forward.

Some information, in formats such as video, pictures and graphics, may be best presented in a displayed format. The domain agents 156 may apply suitable presentation templates in these cases and present the information through the graphical user interface 114. The system agent 150 provides special criteria handlers 152 for presentation and user commands for display presentation and control.

Figure 3:
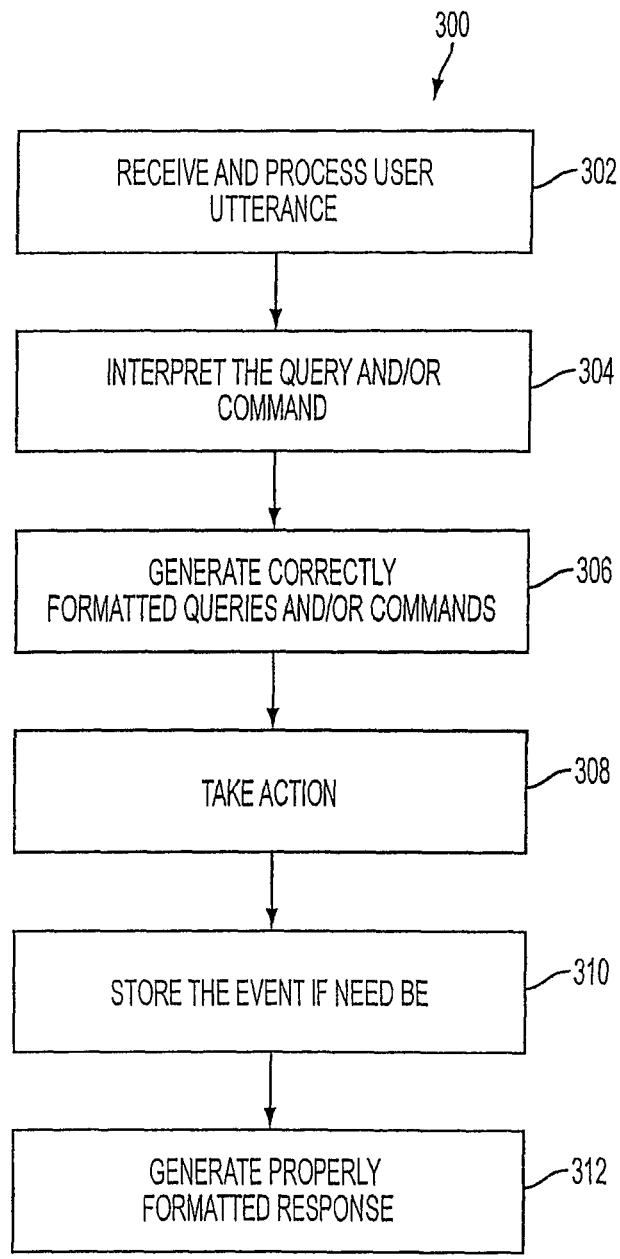
FIG. 3 is a high level process for receiving natural language speech-based queries and/or commands and generating a response according to one embodiment of the invention.

FIG. 3 is a high level process 300 for receiving natural language speech-based queries and/or commands and generating a response according to an embodiment of the invention. The process 300 comprises of individual steps, several of which may be repetitive in order to accommodate partial failures. The process 300 may begin when a user's utterance is received and processed at 302. The user utterance may be a query and/or a command and may be of a natural language speech-based form. After receiving the natural language query and/or command, the query and/or command may be processed so that the data is in a more machine understandable format such as in a digital format. Once the utterance has been converted into an understandable format, the utterance may be processed so that at least an approximate meaning of the utterance can be determined at 304. This may be accomplished by, for example, the use of stored dictionaries, phrases, user profiles, domain agent data, and other data. Based on the approximate meaning of the utterance, one or more correctly formatted queries and/or commands may be generated. A user created query and/or command may require that multiple queries and/or commands may be needed in order to generate the desired response or action. Further, depending upon the context (e.g., who is the user, what is the subject of the query and/or command directed to, at what time or location is the query and/or command being directed to, and other parameters used in defining the query and/or command) in which the query and/or command has been submitted, a specific format for the query and/or command may be required. For instance, each of the domain agents 156 may require that queries and/or commands be formatted in a specific manner. Thus at 306, one or more properly formatted queries and/or commands may be generated. Steps 304 and 306 may be operations which may have to be repeated in order to obtain the correct interpretation of the user utterance and result in the desired response and/or action. Once the properly formatted queries and/or commands are generated, the appropriate action may be taken at 308. This may require that the properly formatted queries and/or commands be sent to specific domain agent[s], information source[s], device[s], or other appropriate destinations that can fulfill the requirements of the query and/or command. Once the appropriate action[s] have been executed, this event may be recorded to, for example, the user's profile, database and/or one or more agents at 310. Such data may be useful for future user inquires and commands. After the action[s] have been performed, a response, if need be, may be generated and forwarded to the user and/or third parties at 312. In the case of a query for retrieving data, the response would contain the requested information. In the case of a command, the response may be a confirmation that a specific action[s] has been executed. The response may be in the form of a natural language format. The response may also be formatted to reflect a particular personality or tone to the response in order to make the response more "human." The response may be relayed to the user and/or third parties as an audio message and/or a visual message displayed on a user interface.

Figure 4A:
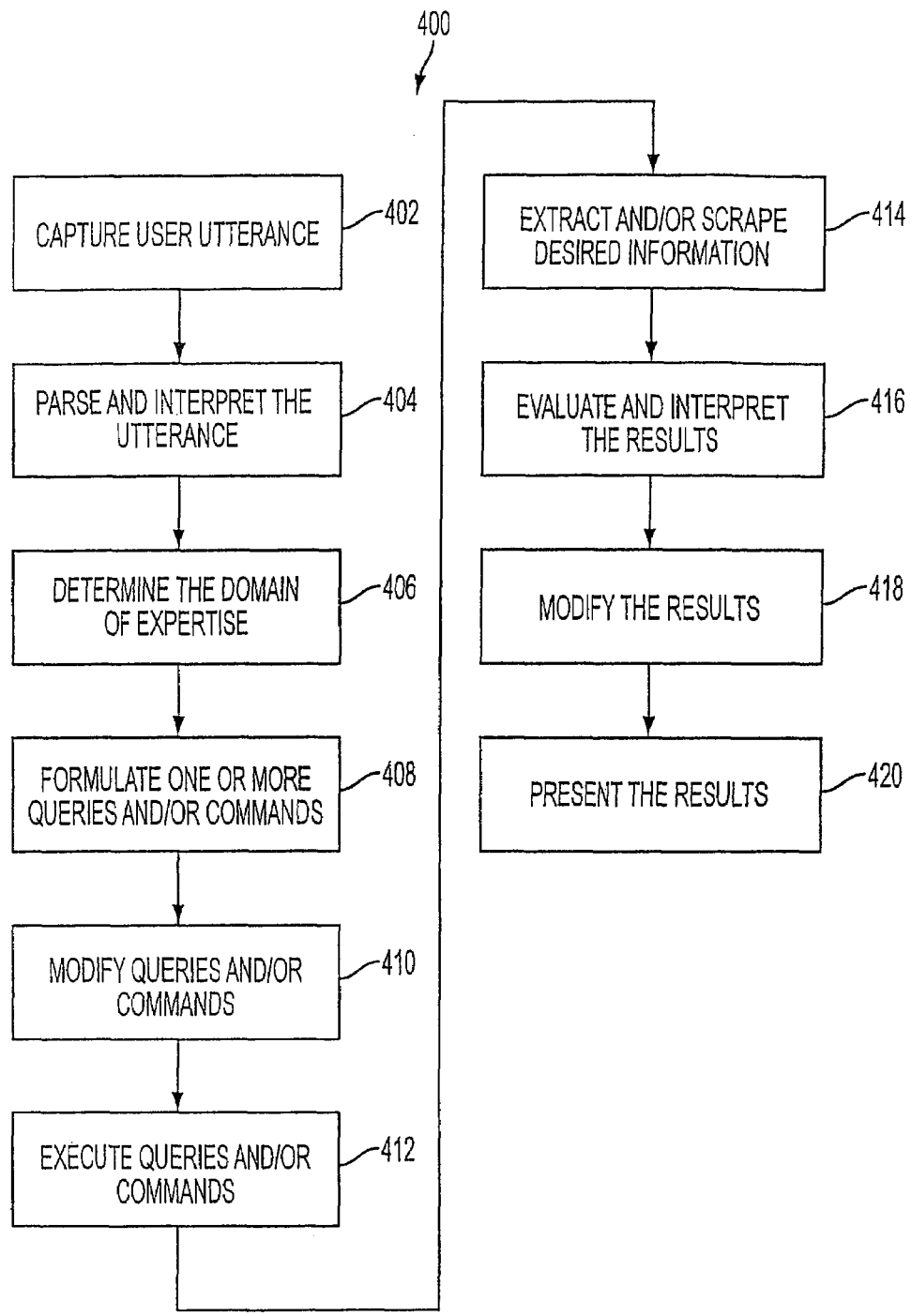
FIG. 4A is a process for receiving natural language speech-based queries and/or commands and generating a response according to one embodiment of the invention.

FIG. 4A is a process 400 for receiving natural language speech-based queries and/or commands and generating a response using the system 90 according to another embodiment of the invention. The process 400 may begin when a user's utterance (i.e., user query and/or command) is captured through accurate speech recognition operating in a variety of real-world environments at 402. Once the utterance is captured, it is parsed and interpreted to determine the query and/or command that is contained in the utterance at 404. Next, review of the query and/or command and determine the domain of expertise required and the context of the query, invoking the proper resources including, for example, agents at 406. The original query and/or command submitted by the user will often require that multiple queries and/or commands be generated. For instance, suppose a user is interested in retrieving the value of her stock portfolio. The user may utter "please get the value of my stock portfolio." The system 90 may review this request together with stored data such as the user's profile and determine keywords such as "get the value" and "my stock portfolio." The system 90 may then generate queries to determine the stocks in the user's portfolio, the number of shares and the source for current pricing information. These queries may then be sent to one or more agent domains, such as a domain which may access a database containing the user's profile and a domain which accesses stock pricing sources to determine the answers to these questions. Queries may be sent to these domain agents or sources in order to obtain the desired data. Thus, at 408 formulate one or more queries that are sent to one or more local and/or network data sources and/or send appropriate commands to local or remote devices or the system itself. The queries are then sent to the designated agent[s]. The agents may then, in turn, generate their own queries and/or commands to be sent to, for example, local or remote information sources to retrieve needed data. The agent generated queries and/or commands may be formatted according to the requirements of the target sources and variable substitutions and transformations are performed to modify the queries to a form most likely to yield desired results from the available sources at 410. Once the queries are formatted correctly, they may be executed in an asynchronous manner and dealing gracefully with failures at 412. As a result of the execution of the queries, results may be returned by the domain agents and/or sources. The system 90 may then extract or scrape the desired information from the one or more results, which may be returned in any one of a number of different formats at 414. That is, the results sought by a user may be the summary or the results of further processing of information obtained from several sources for example. Next, the results may be evaluated and interpreted including processing of errors, and gathering and combining them into a single best result judged to be "best" even if the results are ambiguous, incomplete, or conflicting at 416. Once the best results are determined, perform any required formatting, variable substitutions and transformations to modify the results to a form most easily understood by the user at 418. Finally, the compound results may be presented through the text to speech engine 124, to the user in a useful and expected manner at 420. The process 400 may be performed while accounting for the domain of expertise required, the context in which the question or command is presented, the domain specific information available, the history of the user's interaction, the user preferences, the information sources or commands that are available, and responses obtained from the sources. At each stage of the process 400, probabilistic or fuzzy set decision and matching methods may be applied to deal with inconsistent, ambiguous, conflicting and incomplete information or responses. In addition, the use of asynchronous queries that may result in rapid and graceful failure of some queries or commands may allow the system 90 to robustly return results quickly and in a manner that seems natural to the user.

Figure 4B:
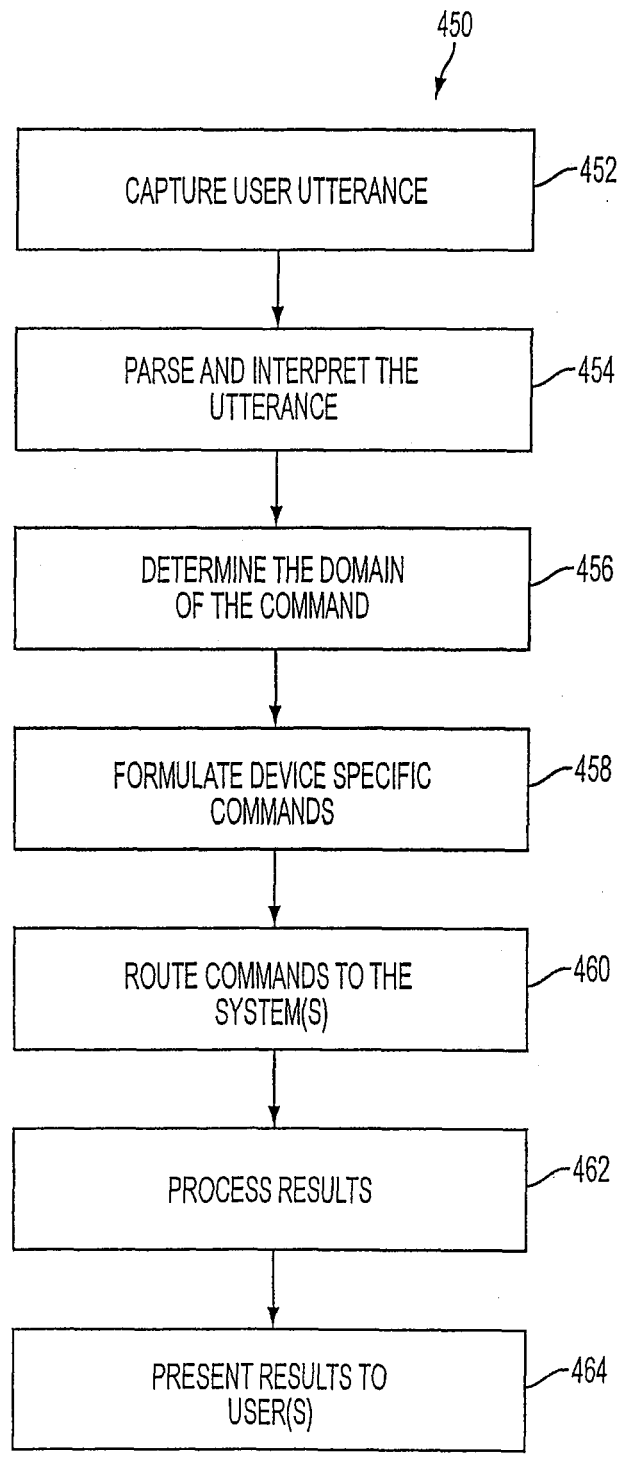
FIG. 4B is a process for receiving natural language speech-based commands in order to locally or remotely control functions of devices according to one embodiment of the invention.

FIG. 4B is a process 450 for receiving natural language speech-based commands in order to locally or remotely control functions of the system 90 or for other devices according to another embodiment of the invention. The process 450 may begin when a user's utterance (i.e., user query and/or command) is captured through accurate speech recognition operating in a variety of real-world environments at 452. Once the utterance is captured, it is parsed and interpreted to determine the command that is contained in the utterance at 454. Next, the command is reviewed and the domain determined for the command and context, invoking the proper resources, including selecting of agents at 456. The original command submitted by the user will often require that multiple queries and/or commands be generated. For instance, suppose a user is interested in recorded his favorite television program. The user may utter "please record my favorite TV program." The system 90 may review this request together with stored data such as the user's profile and determine keywords such as "record" and "my favorite TV program." The system 90 may then generate queries to determine the name, the channel, and time for the user's favorite TV program. These queries may then be sent to a domain agent, which may access a database containing the user's profile and determine the answers to these questions. A command may then be sent to a video recorder ordering the video recorder to record the selected TV program. Thus, at 458 formulate one or more queries that are to be sent to one or more local and/or network data sources and/or send appropriate commands to local or remote devices or the system itself. Next, route the generated commands to the appropriate system[s] and/or external devices at 460. Once the commands have been executed, results including errors may be received and processed at 462. The results of the executed commands may be optionally presented to the user at 464.

Figure 5:
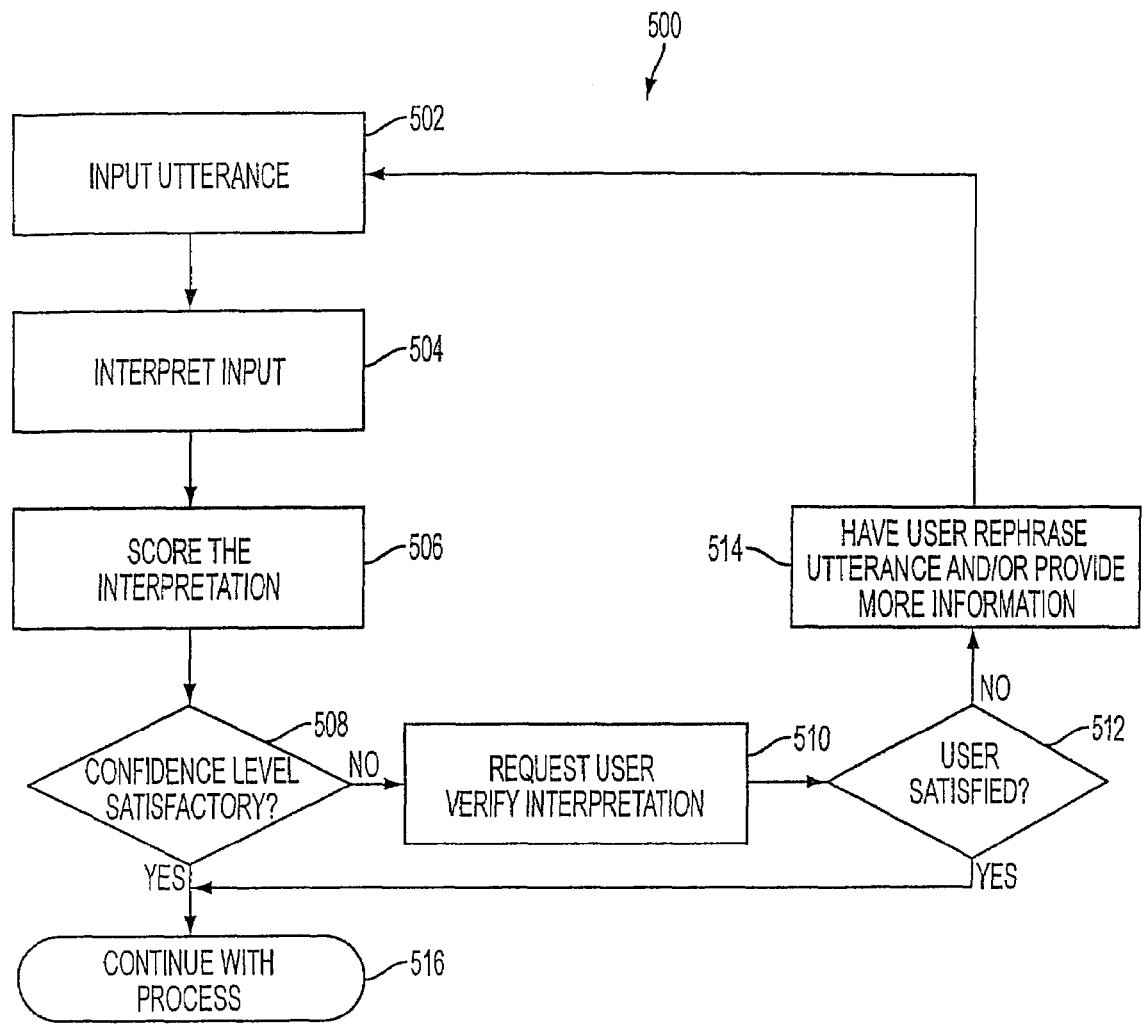
FIG. 5 is a process for correctly interpreting a user's utterance according to one embodiment of the invention.

Some of the steps depicting in FIG. 4A may actually require multiple steps that may also be repetitive. For instance, in step 404, the user's utterance is parsed and interpreted in order to determine the meaning of the utterance. The system 90 may make an initial interpretation of the utterance based on the data stored in, for example, the dictionary and phrases module 112, user profiles 110, agents 106 and the databases 102. A real-time scoring system or other techniques may be applied to the interpretation results in order to generate a domain or a context score. If the confidence level of the domain or context score is not high enough to ensure a reliable response, the system 90 can request that the user verify the question or command is correctly understood. In general, the question may be phrased to indicate the context of the question including all criteria or parameters. If the user confirms that the question is correct, the system 90 may proceed to produce a response. Otherwise, either the user can rephrase the original question, perhaps adding additional information to remove ambiguity, or the system may ask one or more questions to attempt to resolve the ambiguity or other actions may taken. FIG. 5 is a process 500 for correctly interpreting a user's utterance according to one embodiment of the invention. The process 500 generally represents steps 402 and 404 of process 400. Initially the user's utterance is inputted into the system 90 at 502. The input is then interpreted at 504 using, for example, various sources of stored data such as user profiles, agent data, dictionary and phrases, and other relevant data. The interpretation is then scored using, for instance, a weighted scoring system as described previously at 506. Once a score is obtained, a determination is made as to whether the confidence level of the interpretation is satisfactory at 508. In other words, the determination relates to whether the score or confidence level given to the interpretation exceeds a certain value. If the confidence level is determined to be unsatisfactory then a request may be submitted to the user requesting that the user verify the interpretation at 510 and 512. If the user is unsatisfied with the interpretation, he/she may be asked to rephrase the utterance and/or provide additional information at 514. Once the user provides the rephrased utterance and/or additional information, the process 500 returns to the beginning at 502. If, on the other hand, the user is satisfied with the interpretation, then the process 400 for receiving a natural language speech-based queries and/or commands and generating a response may continue at 516.

Figure 6:
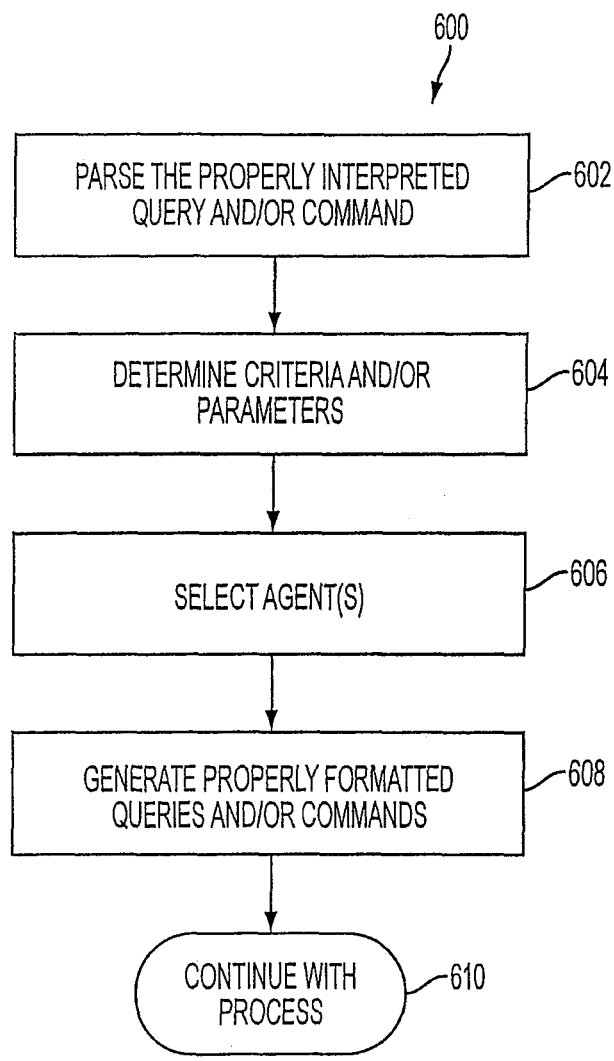
FIG. 6 is a process for determining the proper domain agents to invoke and the properly formatted queries and/or commands that is to be submitted to the agents according to one embodiment of the invention.

Once the meaning of the utterance has been determined, the appropriate domain agent[s] and the query and/or commands properly formatted for the agent[s] may be determined. Referring to FIG. 6, a process 600 is illustrated for determining the proper domain agent[s] to invoke and the proper formatting of queries and/or commands that are to be submitted to the agents 106, as generally depicted in steps 406-408 of FIG. 4A according to one embodiment of the invention. In order to formulate a question or command in the regular grammar used by agents 106, a determination may be made as to the required and optional values for the criteria or parameters of the queries and/or commands. These criteria may have been explicitly supplied by the user or may need to be inferred. Thus, the properly interpreted query and/or command that is generated by, for example, steps 404 and 454 of FIGS. 4A and 4B, is parsed at 602. The content of the properly interpreted query and/or command is then analyzed to determine the criteria and/or parameters of the properly interpreted query and/or command at 604. A context sensitive procedure for extracting the criteria or parameters from the properly interpreted query and/or command may be used. Some criteria are determined by executing algorithms in the agent, while others may be determined by applying probabilistic of fuzzy reasoning to tables of possible values. Prior probabilities or fuzzy possibilities and associated values are received from a number of sources including the history of the dialog, the user profile 110, and the agent. Based on user responses, the prior probabilities or fuzzy possibilities are updated as the system 90 learns the desired behavior. For a weather context, examples of criteria include, location, date and time. Other criteria can include command criteria (i.e., yes/no, on/off, pause, stop), and spelling. The process for determining criteria may be iterative or recursive in order to eliminate ambiguity in the user's question or command. For example, if the user has a place name (or other proper noun) in their utterance, tables in the databases 102 may be reviewed for place names or an attempt may be made to determine which word is the proper noun from the syntax of the utterance. In another example, the user asks "what about flight one hundred and twenty too?" In such a situation, flight information in the database and network information along with context may be used to determine the most plausible interpretation among: flight one-hundred and flight twenty also, flight one-hundred and flight twenty-two, flight 122, and the like. Once the parameters and criteria for the query and/or command have been established, the proper agents 106 may be selected at 606. After selecting the agents 106, a properly formatted query and/or command that will be submitted to the agents 106 may be determined at 608. The query and/or command may be in a standard format or may be a hierarchical data structure used for processing by the agent 106. In order to submit the properly formatted query and/or command to the agent 106, all of the required and some optional tokens for the grammar of the context may be filled in. Often the tokens must be transformed to values and forms acceptable to the agents. The required transformations may be obtained from the agents, dialog history or user profile 110. Examples of transformations or substitutions that may be performed were provided above. Once the properly formatted queries and/or commands are generated, the process (e.g., process 400) may continue at 610.

We claim:

1. A system for processing natural language utterances, comprising:
   a computing device having access to a plurality of domain agents associated with a plurality of different domains, and programmed to execute one or more computer program instructions which, when executed, cause the computing device to:
   receive a first natural language utterance;
   determine that the first natural language utterance contains one or more words that were unrecognized or incorrectly recognized in response to a recognition associated with the first natural language utterance having a confidence level below a predetermined value;
   obtain a phonetic alphabet spelling associated with the one or more unrecognized or incorrectly recognized words in response to the determination;
   look up the one or more unrecognized or incorrectly recognized words in one or more dictionary and phrase tables based on the phonetic alphabet spelling;
   update the one or more dictionary and phrase tables based on a pronunciation associated with the one or more unrecognized or incorrectly recognized words;
   receive a second natural language utterance that comprises a question;
   generate a digitized speech signal from the second natural language utterance;
   recognize one or more words in the second natural language utterance based on a pronunciation associated with the one or more words using the one or more dictionary and phrase tables;
   tag the one or more words in the second natural language utterance with a user identity determined from voice characteristics associated with the digitized speech signal and one or more user profiles;
   determine a context of the question in the second natural language utterance;
   select one of the plurality of domain agents based on the context of the question;
   generate a request associated with the second natural language utterance based on the one or more words in the second natural language utterance and a grammar used by the selected domain agent, wherein the request includes the question;
   invoke the selected domain agent to cause the selected domain agent to process the request; and
   receive a response to the request from the selected domain agent.

2. The system according to claim 1, wherein the computing device is further caused to recognize the one or more words in the second natural language utterance using information in the one or more dictionary and phrase tables, the one or more user profiles, and data supplied by one or more of the plurality of domain agents.

3. The system according to claim 1, wherein the computing device is further caused to:
   create one or more response utterances to present a result generated from the selected domain agent processing the request; and
   output the one or more response utterances via a speaker.

4. The system according to claim 3, wherein the selected domain agent is configured to select a presentation personality to format the result generated from the selected domain agent processing the request and use a template associated with the selected presentation personality to create a response string that includes the generated result, wherein the template is associated with a sarcastic personality, a humorous personality, a sympathetic personality, or an irritable personality.

5. The system according to claim 4, wherein the plurality of domain agents are each further configured to use the template associated with the selected presentation personality to format the response string based on the determined context, one or more criteria associated with the request, a dialog history, or a user profile.

6. The system according to claim 5, wherein the plurality of domain agents are each further configured to apply one or more variable substitutions or transformations to vary an order or a terminology used to present the generated results via the formatted response string.

7. The system according to claim 1, wherein the computing device is further caused to apply prior probabilities or fuzzy possibilities to one or more of keyword matching, a user profile, or a dialog history to determine the context.

8. The system according to claim 1, wherein to process the request, the plurality of domain agents are each configured to:
query one or more local or remote information sources in response to determining that the request includes the question.

9. The system according to claim 1, wherein to process the request, the plurality of domain agents are each configured to:
send multiple duplicate queries to multiple local or remote information sources in response to determining that the request includes the question; and
asynchronously evaluate responses associated with the multiple local or remote information sources processing the multiple duplicate queries.

10. The system according to claim 9, wherein to process the request, the plurality of domain agents are each further configured to use probabilistic or fuzzy scoring techniques to score the asynchronously evaluated responses based on one or more of previously received responses to the multiple duplicate queries, the determined context, one or more criteria associated with the question, a dialog history, a user profile, or information specific to one or more of the plurality of domain agents.

11. The system according to claim 1, wherein the computing device is further configured to:
receive the grammar from the selected domain agent; and
evaluate the determined context and the question using the grammar received from the selected domain agent, wherein the request includes all tokens that are required to format the question in the grammar used by the selected domain agent.

12. The system according to claim 11, wherein the request further includes one or more tokens that are optional to format the question in the grammar used by the selected domain agent.

13. The system according to claim 1, wherein the plurality of domain agents are part of an agent architecture that the computing device has access to, and wherein the agent architecture further includes a system agent configured to provide default functionality and services available to all of the plurality of domain agents, and wherein each of the plurality of domain agents uses a different grammar.

14. The system according to claim 13, wherein the system agent is further configured to manage one or more criteria handlers that the computing device is configured to use to determine the context, and wherein the one or more criteria handlers associated with the system agent are available to the system agent and all of the plurality of domain agents.

15. The system according to claim 13, wherein the agent architecture further includes an agent library that comprises one or more utilities available to the system agent and all of the plurality of domain agents to perform commonly used functions across all of the plurality of different domains.

16. The system according to claim 15, wherein the commonly used functions associated with the one or more utilities in the agent library include at least one of text and string handling, network communications, database lookup and management, fuzzy and probabilistic evaluation, or text to speech formats.

17. The system according to claim 13, wherein the agent architecture further includes an update manager configured to manage updates relating to one or more of the system agent, the plurality of domain agents, the agent library, one or more databases available to the agent architecture, or entries in one or more dictionary and phrase tables.

18. The system according to claim 17, wherein the updates include one or more of a new domain agent, additional domain knowledge associated with one or more of the plurality of domain agents, new keywords associated with one or more of the plurality of domain agents, preferred information sources associated with one or more of the plurality of domain agents, updated domain information associated with one or more of the plurality of domain agents, or updated content associated with one or more of the plurality of domain agents.

19. The system according to claim 18, wherein the agent manager is further configured to:
use a network interface to locate the new domain agent in response to determining that none of the plurality of domain agents currently loaded in the agent architecture are suitable to process the request; and
cause the update manager to load the new domain agent located via the network interface pursuant to the terms and conditions of the license and invoke the new domain agent to process the request.

20. The system according to claim 17, wherein the update manager is configured uninstall one or more of the plurality of domain agents that are unused pursuant to a license with a third party to manage the updates relating to the plurality of domain agents.

21. The system according to claim 20, wherein the agent architecture further includes an agent manager configured to verify compliance with terms and conditions of the license.

22. The system according to claim 13, wherein the agent architecture further includes an agent manager configured to:
load and initialize the system agent and the plurality of domain agents when the computing device starts up; and
unload the system agent and the plurality of domain agents when the computing device shuts down.

23. The system according to claim 13, wherein the computing device is further configured to recognize the one or more words in the second natural language utterance using information in the one or more dictionary and phrase tables, one or more user profiles, and data supplied by one or more of the plurality of domain agents that are associated with the one or more of the plurality of different domains.

24. The system according to claim 1, further comprising an extension and modification facility configured to:
enable behavior associated with the agent architecture to be configured via one or more speech interface commands or one or more inputs to a graphical user interface; and
enable behavior associated with one or more of the plurality of domain agents to be configured via the one or more speech interface commands or the one or more inputs to the graphical user interface.

25. The system according to claim 24, wherein the one or more speech interface commands or the one or more inputs to the graphical user interface can add one or more of new commands, keywords, information, or information sources to configure the behavior associated with the agent architecture or the behavior associated with one or more of the plurality of domain agents.

26. The system according to claim 24, wherein the extension and modification facility includes a generic agent that the one or more speech interface commands or the one or more inputs to the graphical user interface can use to create a new domain agent to add to the agent architecture and configure the behavior associated therewith.

27. The system according to claim 24, wherein the one or more speech interface commands or the one or more inputs to the graphical user interface can use a scripting language to configure the behavior associated with the agent architecture or the behavior associated with the one or more of the plurality of domain agents.

28. The system according to claim 24, wherein the one or more speech interface commands or the one or more inputs to the graphical user interface can create one or more of special reports, query packages, alerts, or output formats to configure the behavior associated with the agent architecture or the behavior associated with the one or more of the plurality of domain agents.

29. The system according to claim 1, wherein the computing device comprises a parser that is configured to determine the context of the question.

30. The system according to claim 29, wherein the parser is configured to determine the context of the question from a dialog history that comprises previous natural language utterances received by the computing device.

31. The system according to claim 30, wherein the previous natural language utterances of the dialog history are all related to a thread of inquiry.

32. The system according to claim 1, wherein the computing device is further caused to determine the context by assigning a score to each of a plurality of candidate contexts based on age of the candidate context.

33. The system according to claim 32, wherein the score for each of the plurality of candidate contexts is further based on a user profile and on data supplied by one or more of the plurality of domain agents.

34. The system according to claim 1, wherein the question is a first question, and wherein the computing device is further caused to:
identify one or more parameters of the first question based on one or more words of the natural language utterance;
receive a subsequent natural language utterance that comprises a second question, wherein the second question is related to the first question; and
generate a second request based on the subsequent natural language utterance, the one or more parameters, and the grammar, wherein the second request includes the second question.

35. The system of claim 34, wherein the second question is a follow-up question of the first question.

36. The system of claim 35, wherein the computing device is further caused to store a value of the one or more parameters in a context stack and to transform the subsequent natural language utterance into the second request by retrieving the value of the one or more parameters from the context stack.

37. A system for processing natural language utterances, comprising:
one or more physical processors programmed to execute one or more computer program instructions which, when executed, cause the one or more physical processors to:
receive a natural language utterance;
determine that one or more words of the natural language utterance were unrecognized or incorrectly recognized in response to a recognition associated with the natural language utterance having a confidence level below a predetermined value;
obtain a phonetic alphabet spelling associated with the one or more unrecognized or incorrectly recognized words in response to the determination;
identify, in one or more dictionary and phrase tables, one or more words that correspond to the one or more unrecognized or incorrectly recognized words based on the phonetic alphabet spelling;
update the one or more dictionary and phrase tables with respect to the one or more corresponding words based on a pronunciation associated with the one or more unrecognized or incorrectly recognized words;
receive a subsequent natural language utterance;
generate a digitized speech signal from the subsequent natural language utterance;
recognize one or more words in the subsequent natural language utterance based on a pronunciation associated with the one or more words in the subsequent natural language utterance using the one or more updated dictionary and phrase tables; and
tag the one or more words in the subsequent natural language utterance with a user identity determined from voice characteristics associated with the digitized speech signal and one or more user profiles.

38. A system for processing natural language utterances, comprising:
a computing device having access to a plurality of domain agents associated with a plurality of different domains, and programmed to execute one or more computer program instructions which, when executed, cause the computing device to:
receive a first natural language utterance;
determine that the first natural language utterance contains one or more words that were unrecognized or incorrectly recognized in response to a recognition associated with the first natural language utterance having a confidence level below a predetermined value;
obtain a phonetic alphabet spelling associated with the one or more unrecognized or incorrectly recognized words in response to the determination;
look up the one or more unrecognized or incorrectly recognized words in one or more dictionary and phrase tables based on the phonetic alphabet spelling;
update the one or more dictionary and phrase tables based on a pronunciation associated with the one or more unrecognized or incorrectly recognized words;
receive a second natural language utterance that comprises a command;
generate a digitized speech signal from the second natural language utterance;
recognize one or more words in the second natural language utterance based on a pronunciation associated with the one or more words using the one or more dictionary and phrase tables;
tag the one or more words in the second natural language utterance with a user identity determined from voice characteristics associated with the digitized speech signal and one or more user profiles;
determine a context of the command in the second natural language utterance;
select one of the plurality of domain agents based on the context of the command;
generate a request associated with the second natural language utterance based on the one or more words in the second natural language utterance and a grammar used by the selected domain agent, wherein the request includes the command; and
invoke the selected domain agent to cause the selected domain agent to process the request.

39. A system for processing natural language utterances, comprising:
a computing device having access to a plurality of domain agents associated with a plurality of different domains, and programmed to execute one or more computer program instructions which, when executed, cause the computing device to:
receive a first natural language utterance;
determine that the first natural language utterance contains one or more words that were unrecognized or incorrectly recognized in response to a recognition associated with the first natural language utterance having a confidence level below a predetermined value;

obtain a phonetic alphabet spelling associated with the one or more unrecognized or incorrectly recognized words in response to the determination;

look up the one or more unrecognized or incorrectly recognized words in one or more dictionary and phrase tables based on the phonetic alphabet spelling;

update the one or more dictionary and phrase tables based on a pronunciation associated with the one or more unrecognized or incorrectly recognized words;

receive a second natural language utterance that comprises a question;

recognize one or more words in the second natural language utterance based on a pronunciation associated with the one or more words using the one or more dictionary and phrase tables;

determine a context of the question in the second natural language utterance;

select one of the plurality of domain agents based on the context of the question;

generate a request associated with the second natural language utterance based on the one or more words in the second natural language utterance and a grammar used by the selected domain agent, wherein the request includes the question;

invoke the selected domain agent to cause the selected domain agent to process the request;

generate one or more response utterances to present a result generated from the selected domain agent, wherein the selected domain agent is configured to select a presentation personality to format the result and use a template associated with the selected presentation personality to generate a response string that includes the generated result, wherein the template is associated with a sarcastic personality, a humorous personality, a sympathetic personality, or an irritable personality; and output the one or more response utterances via a speaker.

40. A system for processing natural language utterances, comprising:

a computing device having access to a plurality of domain agents associated with a plurality of different domains, and programmed to execute one or more computer program instructions which, when executed, cause the computing device to:

receive a first natural language utterance;

determine that the first natural language utterance contains one or more words that were unrecognized or incorrectly recognized in response to a recognition associated with the first natural language utterance having a confidence level below a predetermined value;

obtain a phonetic alphabet spelling associated with the one or more unrecognized or incorrectly recognized words in response to the determination;

look up the one or more unrecognized or incorrectly recognized words in one or more dictionary and phrase tables based on the phonetic alphabet spelling;

update the one or more dictionary and phrase tables based on a pronunciation associated with the one or more unrecognized or incorrectly recognized words;

receive a second natural language utterance that comprises a question;

recognize one or more words in the second natural language utterance based on a pronunciation associated with the one or more words using the one or more dictionary and phrase tables;

determine a context of the question in the second natural language utterance;

select one of the plurality of domain agents based on the context of the question;

generate a request associated with the second natural language utterance based on the one or more words in the second natural language utterance and a grammar used by the selected domain agent, wherein the request includes the question;

invoke the selected domain agent to cause the selected domain agent to process the request, wherein to process the request, the plurality of domain agents are each configured to send multiple duplicate queries to multiple local or remote information sources in response to determining that the request includes the question, and asynchronously evaluate responses associated with the multiple local or remote information sources; and receive a response to the request from the selected domain agent.

41. A system for processing natural language utterances, comprising:

a computing device having access to a plurality of domain agents associated with a plurality of different domains, and programmed to execute one or more computer program instructions which, when executed, cause the computing device to:

receive a first natural language utterance;

determine that the first natural language utterance contains one or more words that were unrecognized or incorrectly recognized in response to a recognition associated with the first natural language utterance having a confidence level below a predetermined value;

obtain a phonetic alphabet spelling associated with the one or more unrecognized or incorrectly recognized words in response to the determination;

look up the one or more unrecognized or incorrectly recognized words in one or more dictionary and phrase tables based on the phonetic alphabet spelling;

update the one or more dictionary and phrase tables based on a pronunciation associated with the one or more unrecognized or incorrectly recognized words;

receive a second natural language utterance that comprises a question;

recognize one or more words in the second natural language utterance based on a pronunciation associated with the one or more words using the one or more dictionary and phrase tables;

determine a context of the question in the second natural language utterance;

select one of the plurality of domain agents based on the context of the question;

generate a request associated with the second natural language utterance based on the one or more words in the second natural language utterance and a grammar used by the selected domain agent, wherein the request includes the question;

invoke the selected domain agent to cause the selected domain agent to process the request; and receive a response to the request from the selected domain agent, wherein the plurality of domain agents are part of an agent architecture that the computing device has access to, wherein the agent architecture further includes a system agent configured to (i) provide default functionality and services available to the plurality of domain agents, (ii) manage one or more criteria handlers that the computing device is configured to use to determine the context, wherein the one or more criteria handlers associated with the system agent are available to the system agent and the plurality of domain agents, and wherein the plurality of domain agents use different grammars.

42. A system for processing natural language utterances, comprising:

a computing device having access to a plurality of domain agents associated with a plurality of different domains, and programmed to execute one or more computer program instructions which, when executed, cause the computing device to:

receive a first natural language utterance;

determine that the first natural language utterance contains one or more words that were unrecognized or incorrectly recognized in response to a recognition associated with the first natural language utterance having a confidence level below a predetermined value;

obtain a phonetic alphabet spelling associated with the one or more unrecognized or incorrectly recognized words in response to the determination;

look up the one or more unrecognized or incorrectly recognized words in one or more dictionary and phrase tables based on the phonetic alphabet spelling;

update the one or more dictionary and phrase tables based on a pronunciation associated with the one or more unrecognized or incorrectly recognized words;

receive a second natural language utterance that comprises a question;

recognize one or more words in the second natural language utterance based on a pronunciation associated with the one or more words using the one or more dictionary and phrase tables;

determine a context of the question in the second natural language utterance;

select one of the plurality of domain agents based on the context of the question;

receive a grammar from the selected domain agent;

evaluate the determined context and the question using the grammar, wherein the request includes all tokens that are required to format the question based on the grammar;

generate a request associated with the second natural language utterance based on the one or more words in the second natural language utterance and a grammar used by the selected domain agent, wherein the request includes the question and one or more tokens that are optional to format the question based on the grammar;

invoke the selected domain agent to cause the selected domain agent to process the request; and receive a response to the request from the selected domain agent.

43. A system for processing natural language utterances, comprising:

a computing device having access to a plurality of domain agents associated with a plurality of different domains, and programmed to execute one or more computer program instructions which, when executed, cause the computing device to:

receive a first natural language utterance;

determine that the first natural language utterance contains one or more words that were unrecognized or incorrectly recognized in response to a recognition associated with the first natural language utterance having a confidence level below a predetermined value;

obtain a phonetic alphabet spelling associated with the one or more unrecognized or incorrectly recognized words in response to the determination;

look up the one or more unrecognized or incorrectly recognized words in one or more dictionary and phrase tables based on the phonetic alphabet spelling;

update the one or more dictionary and phrase tables based on a pronunciation associated with the one or more unrecognized or incorrectly recognized words;

receive a second natural language utterance that comprises a question;

recognize one or more words in the second natural language utterance based on a pronunciation associated with the one or more words using the one or more dictionary and phrase tables;

determine a context of the question in the second natural language utterance;

select one of the plurality of domain agents based on the context of the question;

generate a request associated with the second natural language utterance based on the one or more words in the second natural language utterance and a grammar used by the selected domain agent, wherein the request includes the question;

invoke the selected domain agent to cause the selected domain agent to process the request; and receive a response to the request from the selected domain agent, wherein the plurality of domain agents are part of an agent architecture that the computing device has access to, wherein the agent architecture further includes (i) a system agent configured to provide default functionality and services available to the plurality of domain agents, and (ii) an update manager configured to (a) manage updates relating to one or more of the system agent, the plurality of domain agents, the agent library, one or more databases available to the agent architecture, or entries in the one or more dictionary and phrase tables, and (b) uninstall one or more of the plurality of domain agents that are unused pursuant to a license with a third party to manage the updates relating to the plurality of domain agents, and wherein the plurality of domain agents use different grammars.

44. A system for processing natural language utterances, comprising:

a computing device having access to a plurality of domain agents associated with a plurality of different domains, and programmed to execute one or more computer program instructions which, when executed, cause the computing device to:

receive a first natural language utterance;

determine that the first natural language utterance contains one or more words that were unrecognized or incorrectly recognized in response to a recognition associated with the first natural language utterance having a confidence level below a predetermined value;

obtain a phonetic alphabet spelling associated with the one or more unrecognized or incorrectly recognized words in response to the determination;

look up the one or more unrecognized or incorrectly recognized words in one or more dictionary and phrase tables based on the phonetic alphabet spelling;
update the one or more dictionary and phrase tables based on a pronunciation associated with the one or more unrecognized or incorrectly recognized words;
receive a second natural language utterance that comprises a question;
recognize one or more words in the second natural language utterance based on a pronunciation associated with the one or more words using the one or more dictionary and phrase tables;
determine a context of the question in the second natural language utterance;
select one of the plurality of domain agents based on the context of the question;
generate a request associated with the second natural language utterance based on the one or more words in the second natural language utterance and a grammar used by the selected domain agent, wherein the request includes the question;
invoke the selected domain agent to cause the selected domain agent to process the request; and
receive a response to the request from the selected domain agent, wherein the plurality of domain agents are part of an agent architecture that the computing device has access to, wherein the agent architecture further includes (i) a system agent configured to provide default functionality and services available to the plurality of domain agents, and (ii) an update manager configured to manage updates relating to one or more of the system agent, the plurality of domain agents, the agent library, one or more databases available to the agent architecture, or entries in the one or more dictionary and phrase tables, wherein the updates include one or more of a new domain agent, additional domain knowledge associated with one or more of the plurality of domain agents, new keywords associated with one or more of the plurality of domain agents, preferred information sources associated with one or more of the plurality of domain agents, updated domain information associated with one or more of the plurality of domain agents, or updated content associated with one or more of the plurality of domain agents, and wherein the plurality of domain agents use different grammars, wherein the system agent is further configured to (i) use a network interface to locate the new domain agent in response to determining that none of the plurality of domain agents currently loaded in the agent architecture are suitable to process the request, and (ii) cause the update manager to load the new domain agent located via the network interface pursuant to the terms and conditions of the license and invoke the new domain agent to process the request.

45. A system for processing natural language utterances, comprising:
a computing device having access to a plurality of domain agents associated with a plurality of different domains, and programmed to execute one or more computer program instructions which, when executed, cause the computing device to:
receive a first natural language utterance;
determine that the first natural language utterance contains one or more words that were unrecognized or incorrectly recognized in response to a recognition associated with the first natural language utterance having a confidence level below a predetermined value;
obtain a phonetic alphabet spelling associated with the one or more unrecognized or incorrectly recognized words in response to the determination;
look up the one or more unrecognized or incorrectly recognized words in one or more dictionary and phrase tables based on the phonetic alphabet spelling;
update the one or more dictionary and phrase tables based on a pronunciation associated with the one or more unrecognized or incorrectly recognized words;
receive a second natural language utterance that comprises a question;
recognize one or more words in the second natural language utterance based on a pronunciation associated with the one or more words using the one or more dictionary and phrase tables;
determine a context of the question in the second natural language utterance by assigning a score to each of a plurality of candidate contexts based on age of the candidate context;
select one of the plurality of domain agents based on the context of the question;
generate a request associated with the second natural language utterance based on the one or more words in the second natural language utterance and a grammar used by the selected domain agent, wherein the request includes the question;
invoke the selected domain agent to cause the selected domain agent to process the request, wherein to process the request, the plurality of domain agents are each configured to send multiple duplicate queries to multiple local or remote information sources in response to determining that the request includes the question, and asynchronously evaluate responses associated with the multiple local or remote information sources; and
receive a response to the request from the selected domain agent.

46. A system for processing natural language utterances, comprising:
one or more physical processors programmed to execute one or more computer program instructions which, when executed, cause the one or more physical processors to:
receive a natural language utterance;
determine that one or more words of the natural language utterance were unrecognized or incorrectly recognized in response to a recognition associated with the natural language utterance having a confidence level below a predetermined value;
obtain a phonetic alphabet spelling associated with the one or more unrecognized or incorrectly recognized words in response to the determination;
identify, in one or more dictionary and phrase tables, one or more words that correspond to the one or more unrecognized or incorrectly recognized words based on the phonetic alphabet spelling;
update the one or more dictionary and phrase tables with respect to the one or more corresponding words based on a pronunciation associated with the one or more unrecognized or incorrectly recognized words;
receive a subsequent natural language utterance that comprises a question;
recognize one or more words in the subsequent natural language utterance based on a pronunciation associated with the one or more words in the subsequent natural language utterance using the one or more updated dictionary and phrase tables;

determine a context of the question in the subsequent natural language utterance;

select one of a plurality of domain agents based on the context;

generate a request associated with the subsequent natural language utterance based on the one or more words in the subsequent natural language utterance and a grammar used by the selected domain agent, wherein the request includes the question;

invoke the selected domain agent to cause the selected domain agent to process the request;

generate one or more response utterances to present a result generated from the selected domain agent, wherein the selected domain agent is configured to select a presentation personality to format the result and use a template associated with the selected presentation personality to generate a response string that includes the generated result, wherein the template is associated with a sarcastic personality, a humorous personality, a sympathetic personality, or an irritable personality; and output the one or more response utterances via a speaker.

47. A system for processing natural language utterances, comprising:

one or more physical processors programmed to execute one or more computer program instructions which, when executed, cause the one or more physical processors to:

receive a natural language utterance;

determine that one or more words of the natural language utterance were unrecognized or incorrectly recognized in response to a recognition associated with the natural language utterance having a confidence level below a predetermined value;

obtain a phonetic alphabet spelling associated with the one or more unrecognized or incorrectly recognized words in response to the determination;

identify, in one or more dictionary and phrase tables, one or more words that correspond to the one or more unrecognized or incorrectly recognized words based on the phonetic alphabet spelling;

update the one or more dictionary and phrase tables with respect to the one or more corresponding words based on a pronunciation associated with the one or more unrecognized or incorrectly recognized words;

receive a subsequent natural language utterance that comprises a question;

recognize one or more words in the subsequent natural language utterance based on a pronunciation associated with the one or more words in the subsequent natural language utterance using the one or more updated dictionary and phrase tables;

determine a context of the question in the subsequent natural language utterance;

select one of a plurality of domain agents based on the context;

generate a request associated with the subsequent natural language utterance based on the one or more words in the subsequent natural language utterance and a grammar used by the selected domain agent, wherein the request includes the question; and invoke the selected domain agent to cause the selected domain agent to process the request, wherein to process the request, the plurality of domain agents are each configured to send multiple duplicate queries to multiple local or remote information sources in response to determining that the request includes the question, and asynchronously evaluate responses associated with the multiple local or remote information sources.

48. A system for processing natural language utterances, comprising:

one or more physical processors programmed to execute one or more computer program instructions which, when executed, cause the one or more physical processors to:

receive a natural language utterance;

determine that one or more words of the natural language utterance were unrecognized or incorrectly recognized in response to a recognition associated with the natural language utterance having a confidence level below a predetermined value;

obtain a phonetic alphabet spelling associated with the one or more unrecognized or incorrectly recognized words in response to the determination;

identify, in one or more dictionary and phrase tables, one or more words that correspond to the one or more unrecognized or incorrectly recognized words based on the phonetic alphabet spelling;

update the one or more dictionary and phrase tables with respect to the one or more corresponding words based on a pronunciation associated with the one or more unrecognized or incorrectly recognized words;

receive a subsequent natural language utterance that comprises a question;

recognize one or more words in the subsequent natural language utterance based on a pronunciation associated with the one or more words in the subsequent natural language utterance using the one or more updated dictionary and phrase tables;

determine a context of the question in the subsequent natural language utterance;

select one of a plurality of domain agents based on the context;

receive a grammar from the selected domain agent;

evaluate the determined context and the question using the grammar, wherein the request includes all tokens that are required to format the question based on the grammar;

generate a request associated with the subsequent natural language utterance based on the one or more words in the subsequent natural language utterance and the grammar, wherein the request includes the question and one or more tokens that are optional to format the question based on the grammar; and invoke the selected domain agent to cause the selected domain agent to process the request.

49. A system for processing natural language utterances, comprising:

one or more physical processors programmed to execute one or more computer program instructions which, when executed, cause the one or more physical processors to:

receive a natural language utterance;

determine one or more words of the natural language utterance were unrecognized or incorrectly recognized in response to a recognition associated with the natural language utterance having a confidence level below a predetermined value;

obtain a phonetic alphabet spelling associated with the one or more unrecognized or incorrectly recognized words in response to the determination;

identify, in one or more dictionary and phrase tables, one or more words that correspond to the one or more unrecognized or incorrectly recognized words based on the phonetic alphabet spelling;

update the one or more dictionary and phrase tables with respect to the one or more corresponding words based on a pronunciation associated with the one or more unrecognized or incorrectly recognized words;

receive a subsequent natural language utterance that comprises a question;

recognize one or more words in the subsequent natural language utterance based on a pronunciation associated with the one or more words in the subsequent natural language utterance using the one or more updated dictionary and phrase tables;

determine a context of the question in the subsequent natural language utterance by assigning a score to each of a plurality of candidate contexts based on age of the candidate context;

select one of a plurality of domain agents based on the context;

generate a request associated with the subsequent natural language utterance based on the one or more words in the subsequent natural language utterance and a grammar used by the selected domain agent, wherein the request includes the question; and invoke the selected domain agent to cause the selected domain agent to process the request, wherein to process the request, the plurality of domain agents are each configured to send multiple duplicate queries to multiple local or remote information sources in response to determining that the request includes the question, and asynchronously evaluate responses associated with the multiple local or remote information sources.

50. A system for processing natural language utterances, comprising:

a computing device having access to a plurality of domain agents associated with a plurality of different domains, and programmed to execute one or more computer program instructions which, when executed, cause the computing device to:

receive a first natural language utterance;

determine that the first natural language utterance contains one or more words that were unrecognized or incorrectly recognized in response to a recognition associated with the first natural language utterance having a confidence level below a predetermined value;

obtain a phonetic alphabet spelling associated with the one or more unrecognized or incorrectly recognized words in response to the determination;

look up the one or more unrecognized or incorrectly recognized words in one or more dictionary and phrase tables based on the phonetic alphabet spelling;

update the one or more dictionary and phrase tables based on a pronunciation associated with the one or more unrecognized or incorrectly recognized words;

receive a second natural language utterance that comprises a command;

recognize one or more words in the second natural language utterance based on a pronunciation associated with the one or more words using the one or more dictionary and phrase tables;

determine a context of the command in the second natural language utterance;

select one of the plurality of domain agents based on the context of the command;

receive a grammar from the selected domain agent;

evaluate the determined context and the command using the grammar, wherein the request includes all tokens that are required to format the command based on the grammar;

generate a request associated with the second natural language utterance based on the one or more words in the second natural language utterance and a grammar used by the selected domain agent, wherein the request includes the command and one or more tokens that are optional to format the command based on the grammar; and invoke the selected domain agent to cause the selected domain agent to process the request.

* * * * *